United States Patent
Kim et al.

(10) Patent No.: US 11,605,374 B2
(45) Date of Patent: Mar. 14, 2023

(54) METHOD AND DEVICE FOR PROVIDING VOICE RECOGNITION SERVICE

(71) Applicant: SAMSUNG ELECTRONICS CO., LTD., Suwon-si (KR)

(72) Inventors: Jeongsu Kim, Suwon-si (KR); Keunseok Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 303 days.

(21) Appl. No.: 16/874,152

(22) Filed: May 14, 2020

(65) Prior Publication Data

US 2020/0365138 A1    Nov. 19, 2020

Related U.S. Application Data

(60) Provisional application No. 62/848,698, filed on May 16, 2019.

(30) Foreign Application Priority Data

Nov. 22, 2019    (KR) .......................... 10-2019-0151626

(51) Int. Cl.
*G10L 15/22*    (2006.01)
*G10L 15/06*    (2013.01)
(Continued)

(52) U.S. Cl.
CPC ............ *G10L 15/063* (2013.01); *G10L 13/00* (2013.01); *G10L 15/08* (2013.01); *G10L 15/22* (2013.01);
(Continued)

(58) Field of Classification Search
CPC ....... G10L 15/063; G10L 13/00; G10L 15/08; G10L 15/22; G10L 15/32;
(Continued)

(56) References Cited

U.S. PATENT DOCUMENTS 8,103,020 B2    1/2012  Avendano et al.
8,825,481 B2    9/2014  Thambiratnam et al.
(Continued)

FOREIGN PATENT DOCUMENTS

EP    3 624 114 A1    3/2020
JP    7-113917 A    5/1995
(Continued)

OTHER PUBLICATIONS

International Search Report and Written Opinion dated Mar. 4, 2020 from the International Searching Authority in application No. PCT/KR2019/016181 (PCT/ISA210 & 237).
(Continued)

*Primary Examiner* — Vijay B Chawan
(74) *Attorney, Agent, or Firm* — Sughrue Mion, PLLC

(57) ABSTRACT

A method, performed by the electronic device, of providing a voice recognition service includes obtaining a user call keyword for activating the voice recognition service, based on a first user voice input; generating a user-customized voice database (DB) by inputting the obtained user-customized keyword to a text to speech module; and obtaining a user-customized feature by inputting an audio signal of the user-customized voice DB to a pre-trained wake-up recognition module.

24 Claims, 22 Drawing Sheets

(51) Int. Cl.
*G10L 15/32* (2013.01)
*G10L 15/08* (2006.01)
*G10L 13/00* (2006.01)

(52) U.S. Cl.
CPC ...... *G10L 15/32* (2013.01); *G10L 2015/0636* (2013.01); *G10L 2015/088* (2013.01); *G10L 2015/223* (2013.01); *G10L 2015/227* (2013.01)

(58) Field of Classification Search
CPC ....... G10L 2015/0636; G10L 2015/088; G10L 2015/223; G10L 2015/227
See application file for complete search history.

(56) References Cited

U.S. PATENT DOCUMENTS

| | | | |
|---|---|---|---|
| 9,305,554 | B2 | 4/2016 | Jagatheesan et al. |
| 9,508,340 | B2 | 11/2016 | Parada San Martin et al. |
| 9,697,828 | B1* | 7/2017 | Prasad .................... G10L 15/08 |
| 9,703,350 | B2 | 7/2017 | Nigam et al. |
| 9,754,584 | B2 | 9/2017 | Parada San Martin et al. |
| 9,852,729 | B2 | 12/2017 | Hoffmeister |
| 9,954,506 | B2* | 4/2018 | Seefeldt ................ G10L 21/038 |
| 10,032,449 | B2 | 7/2018 | Chen et al. |
| 10,783,178 | B2* | 9/2020 | Garrett .................. G06F 40/169 |
| 2005/0126369 | A1 | 6/2005 | Kirkeby et al. |
| 2005/0182628 | A1 | 8/2005 | Choi |
| 2011/0035219 | A1 | 2/2011 | Kadirkamanathan et al. |
| 2011/0313764 | A1* | 12/2011 | Bacchiani ............... G10L 15/32 704/235 |
| 2013/0191126 | A1 | 7/2013 | Thambiratnam et al. |
| 2014/0379334 | A1* | 12/2014 | Fry ......................... G10L 15/22 704/235 |
| 2015/0025890 | A1* | 1/2015 | Jagatheesan ............ G10L 15/32 704/255 |
| 2016/0019887 | A1* | 1/2016 | Kim ...................... G10L 15/183 704/246 |
| 2016/0293168 | A1* | 10/2016 | Chen ....................... G10L 15/22 |
| 2017/0018270 | A1* | 1/2017 | Min ...................... G10L 15/063 |
| 2017/0083285 | A1* | 3/2017 | Meyers .................. G10L 15/00 |
| 2017/0092265 | A1* | 3/2017 | Sainath ................... G06N 3/084 |
| 2017/0194006 | A1* | 7/2017 | Guevara ................. G10L 15/07 |
| 2017/0270919 | A1* | 9/2017 | Parthasarathi .......... G10L 25/87 |
| 2018/0061402 | A1* | 3/2018 | Devaraj .................. G10L 15/22 |
| 2018/0108343 | A1* | 4/2018 | Stevens .................. G10L 13/00 |
| 2018/0197533 | A1* | 7/2018 | Lyon ...................... G10L 15/02 |
| 2018/0211652 | A1* | 7/2018 | Mun ...................... G10L 15/187 |
| 2019/0043481 | A1 | 2/2019 | Georges et al. |
| 2019/0122654 | A1* | 4/2019 | Song ...................... G06N 3/084 |
| 2019/0172467 | A1* | 6/2019 | Kim ....................... G10L 15/16 |
| 2019/0385608 | A1* | 12/2019 | Lee ......................... G10L 15/30 |
| 2020/0090658 | A1* | 3/2020 | Shin ....................... G06N 3/084 |
| 2020/0365138 | A1* | 11/2020 | Kim ....................... G06F 3/167 |
| 2021/0125605 | A1* | 4/2021 | Lee ......................... G06F 40/30 |

FOREIGN PATENT DOCUMENTS

| | | | |
|---|---|---|---|
| KR | 1020080077874 | A | 8/2008 |
| KR | 101295727 | B1 | 8/2013 |
| KR | 1020160010961 | A | 1/2016 |
| KR | 1020180090046 | A | 8/2018 |
| KR | 10-2019-0014569 | A | 2/2019 |
| KR | 10-2019-0045038 | A | 5/2019 |
| KR | 10-2167157 | B1 | 10/2020 |
| WO | 2017/217978 | A1 | 12/2017 |
| WO | WO-2017217978 | A1 * | 12/2017 ............ G06F 3/167 |
| WO | 2018/028767 | A1 | 2/2018 |
| WO | 2021/040842 | A1 | 3/2021 |

OTHER PUBLICATIONS

International Search Report and Written Opinion dated May 6, 2020 from the International Searching Authority in application No. PCT/KR2020/001061 (PCT/ISA210 & 237).

Kanishka Rao et al., "Exploring Architectures, Data and Units for Streaming End-to-End Speech Recognition With RNN-Transducer", arXiv:1801.00841v1, Jan. 2, 2018, 7 pages total.
Kazuki Irie et al., "On the Choice of Modeling Unit for Sequence-to-Sequence Speech Recognition", arXiv:1902.01955v2, Jul. 23, 2019, 5 pages total.
Chengzhu Yu et al., "A Multistage Training Framework for Acoustic-to-Word Model", Interspeech 2018, 10.21437, Sep. 2-6, 2018, pp. 786-790, 5 pages total.
Ramon Sanabria et al., "Hierarchical Multitask Learning With CTC", arXiv:1807.07104v5, 2018 IEEE Workshop on Spoken Language Technology, 2018, pp. 1-6, 6 pages total.
Zichao Yang et al., "Hierarchical Attention Networks for Document Classification", NAACL HLT, 2016, 10 pages total.
Michael L. Seltzer et al., "An Investigation of Deep Neural Networks for Noise Robust Speech Recognition", Int. Conf. Acoust. Speech, and Signal Processing, 2013, 5 pages total.
Dong Yu et al., "Feature Learning in Deep Neural Networks—Studies on Speech Recognition Tasks", arXiv:1301.3605v3, Mar. 8, 2013, pp. 1-9, 9 pages total.
Vincent Vanhoucke et al., "Improving the speed of neural networks on CPUs", Deep Learning and Unsupervised Feature Learning NIPS Workshop, 2011, pp. 1-8, 8 pages total.
Geoffrey Hinton et al., "Deep Neural Networks for Acoustic Modeling in Speech Recognition", IEEE Signal Proces, Apr. 27, 2012, pp. 1-27, 27 pages total.
Chanwoo Kim et al., "Generation of large-scale simulated utterances in virtual rooms to train deep-neural networks for far-field speech recognition in Google Home", Interspeech 2017, Aug. 2017, pp. 1-5, 5 pages total.
Bo Li et al., "Acoustic Modeling for Google Home", Interspeech 2017, Aug. 20-24, 2017, pp. 399-403, 5 pages total.
Tara N. Sainath et al., "Raw Multichannel Processing using Deep Neural Networks", New Era for Robust Speech Recognition, Oct. 2017, pp. 1-28, 28 pages total.
Tara N. Sainath et al., "Multichannel Signal Processing with Deep Neural Networks for Automatic Speech Recognition", IEEE/ACM Trans. Audio, Speech, Lang. Process., Feb. 2017, pp. 1-15, 15 pages total.
Paul Mermelstein, "Automatic segmentation of speech into syllabic units," J. Acoust. Soc. of Am., vol. 58, Jan. 1975, pp. 247-256, 10 pages total.
Dario Amodei et al., "Deep Speech 2: End-to-End Speech Recognition in English and Mandarin", arXiv:1512.02595v1, Proceedings of The 33rd International Conference on M., Dec. 8, 2015, pp. 1-28, 28 pages total.
Hossein Hadian et al., "End-to-end speech recognition using lattice-free MMI", Interspeech 2018, 10.21437, Sep. 2-6, 2018, pp. 12-16, 5 pages total.
Shane Settle et al., "End-to-End Multi-speaker Speech Recognition", Mitsubishi Electric Research Laboratories, IEEE International Conference on Acoustics, Speech, and Signal Processing, Apr. 2018, 7 pages total.
A. Zehetner et al., "Wake-up-Word Spotting for Mobile Systems", EUSIPCO, Graz University of Technology Signal Processing and Speech Communication Laboratory, 2014, 5 pages total.
Johan Schalkwyk, "An All-Neural On-Device Speech Recognizer", Google AI Blog, Mar. 12, 2019, 4 pages total.
Communication dated Oct. 28, 2021 by the European Patent Office in European Patent Application No. 19888960.2.
Communication dated Dec. 7, 2021 by the European Patent Office in European Patent Application No. 20806657.1.
Communication dated Oct. 14, 2021 by the European Patent Office in European Patent Application No. 20744656.8.
Umesh, S. et al., "A Study of Filter Bank Smoothing in MFCC Features for Recognition of Children's Speech", IEEE Transactions on Audio, Speech, and Language Processing, vol. 15, No. 8, Nov. 2007, pp. 2418-2430, XP011192988.
Lin, Shih-Hsiang et al., "Improved Histogram Equalization (HEQ) for Robust Speech Recognition", Multimedia and Expo, 207 IEEE International Conference On, IEEE, PI, Jul. 2, 2007, pp. 2234-2237, XP031124105.

(56) References Cited

OTHER PUBLICATIONS

Gouda, Ahmed Mostafa et al., "Robust Automatic Speech Recognition System Based on Using Adaptive Time-Frequency Masking", 2016 11th International Conference on Computer Engineering & Systems (ICCES), IEEE, Dec. 20, 2016, pp. 181-186, XP033046674.

Rygaard, Luise Valentin, "Using Synthesized Speech to Improve Speech Recognition for Low-Resource Languages", Dec. 31, 2015, pp. 1-6, XP055512265.

Ueno, Sei et al., "Multi-speaker Sequence-to-Sequence Speech Synthesis for Data Augmentation in Acoustic-to-Word Speech Recognition", ICASSP 2019—2019 IEEE International Conference on Acoustics, Speech and Signal Processing (ICASSP), IEEE, May 12, 2019, pp. 6161-6165, XP033565395.

Sharma, Eva et al., "Adaptation of RNN Transducer With Text-to-Speech Technology for Keywrod Spotting", ICASSP 2020—2020 IEEE International Conference on Acoustics, Speech and Sinal Processing (ICASSP), IEEE, May 4, 2020, pp. 7484-7488, XP033792821.

Sinha, Rohit et al., "A shift-based approach to speaker normalization using non-linear frequency-scaling model", Speech Communication, Elsevier Science Publishers, vol. 50, No. 3, Jan. 29, 2008, pp. 191-202, XP022436795.

Williams, Ian et al., "Contextual Speech Recognition in End-to-End Neural Network Systems using Beam Search", Interspeech 2018, Sep. 2, 2018, pp. 2227-2231, XP055719650.

Gowda, Dhananjaya et al., "Multi-task multi-resolution char-to-BPE cross-attention decoder for end-to-end speech recognition", Interspeech 2019, Sep. 15, 2019, pp. 2783-2787, XP055846610.

Garg, Abhinav et al., "Improved Multi-stage Training of Online Attention-Based Encoder-Decoder Models", 2019 IEEE Automatic Speech Recognition and Understanding Workshop (ASRU), IEEE, Dec. 14, 2019, pp. 70-77, XP033718917.

Communication dated Aug. 13, 2020 issued by the International Searching Authority in counterpart Application No. PCT/KR2020/006300 (PCT/ISA/220, PCT/ISA/210, and PCT/ISA/237).

\* cited by examiner

FIG. 1
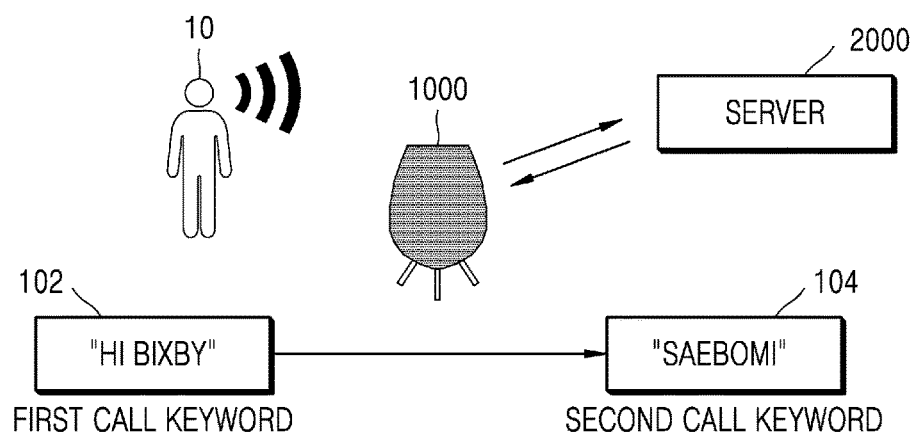
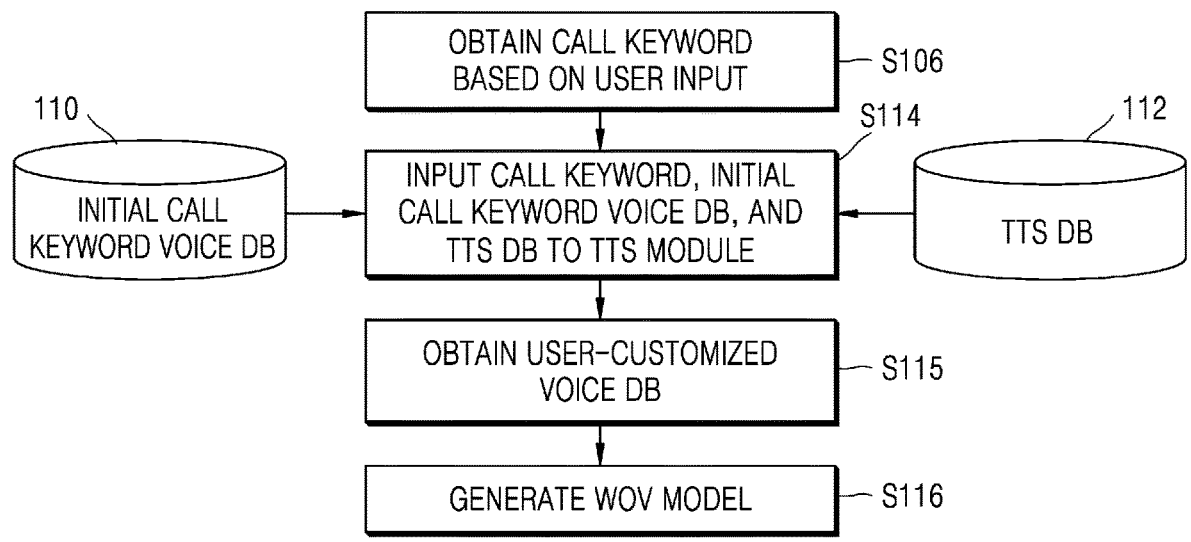

METHOD AND DEVICE FOR PROVIDING VOICE RECOGNITION SERVICE

CROSS-REFERENCE TO RELATED APPLICATIONS

This application is based on and claims the benefit of U.S. Provisional Patent Application No. 62/848,698, filed on May 16, 2019, in the United States Patent and Trademark Office, and is based on and claims priority under 35 U.S.C. § 119 to Korean Patent Application No. 10-2019-0151626, filed on Nov. 22, 2019, in the Korean Intellectual Property Office, the disclosures of which are incorporated by reference herein in their entireties.

BACKGROUND

1. Field

The disclosure relates to a device for and a method of providing a voice recognition service. More particularly, the disclosure relates to an electronic device for and a method of providing a voice recognition service that is activated based on a user-customized keyword.

2. Description of the Related Art

Artificial intelligence (AI) systems train themselves and make determinations spontaneously to become smarter, in contrast to existing rule-based smart systems. Because the recognition rates of AI systems improve and the AI systems more accurately understand a user's preferences the more they are used, existing rule-based smart systems are being gradually replaced by deep-learning AI systems.

AI technology includes machine learning (deep learning) and element technologies employing machine learning. Machine learning is an algorithm technology that self-classifies/learns the characteristics of input data, and each of the element technologies is a technology using a machine learning algorithm, such as deep learning, and includes technical fields, such as linguistic understanding, visual understanding, deduction/prediction, knowledge representation, and operation control.

Various fields to which AI technology is applied are as follows. Linguistic understanding is a technique of recognizing a language/character of a human and applying/processing the language/character of a human, and includes natural language processing, machine translation, a conversation system, questions and answers, voice recognition/synthesis, and the like. Visual understanding is a technique of recognizing and processing an object like in human vision, and includes object recognition, object tracking, image search, human recognition, scene understanding, space understanding, image improvement, and the like. Deduction/prediction is a technology of logically performing deduction and prediction by determining information, and includes knowledge/probability-based deduction, optimization prediction, a preference-based plan, recommendation, and the like. Knowledge representation is a technique of automatically processing human experience information as knowledge data, and includes knowledge establishment (data generation/classification), knowledge management (data utilization), and the like. Operation control is a technique of controlling autonomous driving of a vehicle and motions of a robot, and includes motion control (navigation, collision avoidance, and driving), manipulation control (behavior control), and the like.

In the recent voice recognition field, various techniques for recognizing the voice of a user have been researched, and, in particular, a Wake On Voice (WOV) technique for maneuvering a voice recognition service has been actively researched as a technique for addressing power consumption and a mal-function caused due to a regular operation of a system for a voice recognition service.

SUMMARY

Provided are an electronic device and a method capable of activating a voice recognition service.

Provided are an electronic device for and a method of providing an activated voice recognition service. More particularly, provided are an electronic device for and a method of providing a voice recognition service activated based on a user-customized call keyword.

Additional aspects will be set forth in part in the description which follows and, in part, will be apparent from the description, or may be learned by practice of the presented embodiments.

According to an embodiment of the disclosure, a method, performed by an electronic device, of providing a voice recognition service includes obtaining a user call keyword for activating the voice recognition service, based on a first user voice input; generating a user-customized voice database (DB) by inputting the obtained user call keyword to a text to speech (TTS) module; and obtaining a user-customized feature by inputting an audio signal of the user-customized voice DB to a wake-up recognition module.

According to an embodiment of the disclosure, the method may further include obtaining a voice DB related to a call keyword previously stored before the user call keyword is obtained, in order to activate the voice recognition service; and generating the user-customized voice DB by inputting the obtained voice DB and the user call keyword to the TTS module.

According to an embodiment of the disclosure, the method may further include obtaining an audio signal, based on a second user voice input; obtaining an output value of the wake-up recognition module from the wake-up recognition module by inputting the obtained audio signal to the wake-up recognition module; and activating the voice recognition service, based on a result of a comparison between the obtained output value of the wake-up recognition module and the user-customized feature.

According to an embodiment of the disclosure, the TTS module may be configured to change audio signals of the user-customized voice DB, based on at least one acoustic feature for uttering the call keyword that is obtained from a speaker voice model including acoustic features of a plurality of speakers.

According to an embodiment of the disclosure, the method may further include generating similar keywords that are similar to the user call keyword, by using a pre-stored language model; generating a similar voice DB by inputting the generated similar keyword to the TTS module; and refining layers within the wake-up recognition module and attention related to a connection strength between the layers, based on audio signals of the similar voice DB and the user-customized voice DB.

According to an embodiment of the disclosure, the obtaining of the audio signal may include determining a window length of a window for division in units of frames; overlapping windows each having the determined window length at a certain window interval; and dividing the obtained audio signal into a plurality of frames by using the overlapped windows.

According to an embodiment of the disclosure, the wake-up recognition module may include a wake-up recognition model including a shared layer to which audio features extracted from consecutive frames within a certain section from among the plurality of frames obtained based on the second user voice input are simultaneously input, a speaker identification layer for identifying a speaker feature of the audio signal when a frame unit representation output by the shared layer is input, an acoustic feature identification layer for identifying the acoustic feature of the audio signal, and a keyword identification layer for identifying a keyword feature included in the audio signal.

According to an embodiment of the disclosure, the obtaining of the output value of the wake-up recognition module may include obtaining the speaker feature, the acoustic feature, and the keyword feature on respective segment levels of the speaker identification layer, the acoustic feature identification layer and the keyword identification layer; setting attention to the speaker feature, the acoustic feature, and the keyword feature; and obtaining the output value of the wake-up recognition module by concatenating at least one of the speaker feature, the acoustic feature, or the keyword feature according to the attention.

According to an embodiment of the disclosure, the activating of the voice recognition service may include determining a similarity score related to similarity between the output value of the wake-up recognition module and the user-customized feature; and activating the voice recognition service, based on whether the determined similarity score is greater than or equal to a preset first threshold value.

According to an embodiment of the disclosure, the activating of the voice recognition service may include determining respective portion similarity scores of the speaker feature, the acoustic feature, and the keyword feature within the audio feature; and activating the voice recognition service when the portion similarity score of the speaker feature is greater than or equal to a second threshold value, the portion similarity score of the acoustic feature is greater than or equal to a third threshold value, and the portion similarity score of the keyword feature is greater than or equal to a fourth threshold value.

According to an embodiment of the disclosure, the acoustic feature identification layer within the wake-up recognition model may be removed when training of the wake-up recognition model is completed.

According to an embodiment of the disclosure, the method may further include generating a user-customized voice model, based on the user-customized feature; and storing the generated user-customized voice model.

According to an embodiment of the disclosure, an electronic device for providing a voice recognition service includes a memory storing one or more instructions; and a processor configured to execute the one or more instructions to obtain a user call keyword for activating the voice recognition service, based on a first user voice input, generate a user-customized voice DB by inputting the obtained user call keyword to a TTS module, and obtain a user-customized feature by inputting an audio signal of the user-customized voice DB to a wake-up recognition module.

According to an embodiment of the disclosure, the processor may be further configured to execute the one or more instructions to obtain a voice DB related to a call keyword previously stored before the user call keyword is obtained, in order to activate the voice recognition service, and generate the user-customized voice DB by inputting the obtained voice DB and the user call keyword to the TTS module.

According to an embodiment of the disclosure, the processor may be further configured to execute the one or more instructions to obtain an audio signal, based on a second user voice input, obtain an output value of the wake-up recognition module from the wake-up recognition module by inputting the obtained audio signal to the wake-up recognition module, and activate the voice recognition service, based on a result of a comparison between the obtained output value of the wake-up recognition module and the user-customized feature.

According to an embodiment of the disclosure, the TTS module may be configured to change audio signals of the user-customized voice DB, based on at least one acoustic feature for uttering the call keyword that is obtained from a speaker voice model including acoustic features of a plurality of speakers.

According to an embodiment of the disclosure, the processor may be further configured to execute the one or more instructions to generate similar keywords that are similar to the user call keyword, by using a pre-stored language model, generate a similar voice DB by inputting the generated similar keyword to the TTS module, and refine layers within the wake-up recognition module and attention related to a connection strength between the layers, based on audio signals of the similar voice DB and the user-customized voice DB.

According to an embodiment of the disclosure, the processor may be further configured to execute the one or more instructions to determine a window length of a window for division in units of frames, overlap windows each having the determined window length at a certain window interval, and divide the obtained audio signal into a plurality of frames by using the overlapped windows.

According to an embodiment of the disclosure, the wake-up recognition module may include a shared layer to which audio features extracted from consecutive frames within a certain section from among the plurality of frames obtained based on the second user voice input are simultaneously input, a speaker identification layer for identifying a speaker feature of the audio signal when a frame unit representation output by the shared layer is input, an acoustic feature identification layer for identifying the acoustic feature of the audio signal, and a keyword identification layer for identifying a keyword feature included in the audio signal.

According to an embodiment of the disclosure, the processor may be further configured to execute the one or more instructions to obtain the speaker feature, the acoustic feature, and the keyword feature on respective segment levels of the speaker identification layer, the acoustic feature identification layer and the keyword identification layer; set attention to the speaker feature, the acoustic feature, and the keyword feature; and obtain the output value of the wake-up recognition module by concatenating at least one of the speaker feature, the acoustic feature, or the keyword feature according to the attention.

According to an embodiment of the disclosure, a non-transitory computer-readable recording medium has recorded thereon a program for performing a method of providing a voice recognition service, the method including obtaining a user call keyword for activating the voice recognition service, based on a first user voice input; generating a user-customized voice DB by inputting the obtained user call keyword to a TTS module; and obtaining a user-customized feature by inputting an audio signal of the user-customized voice DB to a wake-up recognition module.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 is a diagram schematically illustrating a method, performed by an electronic device, of providing a voice recognition service, according to an embodiment;

DETAILED DESCRIPTION

Figure 2:
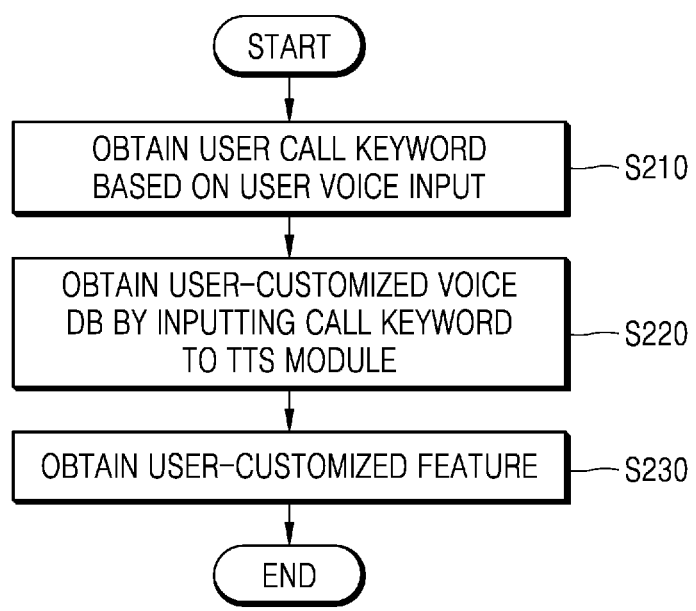
FIG. 2 is a flowchart of a method, performed by an electronic device, of providing a voice recognition service, based on a user call keyword, according to an embodiment.

Hereinafter, the terms used in the specification will be briefly described, and then the disclosure will be described in detail.

Although general terms widely used at present were selected for describing the disclosure in consideration of the functions thereof, these general terms may vary according to intentions of one of ordinary skill in the art, case precedents, the advent of new technologies, and the like. Terms arbitrarily selected by the applicant of the disclosure may also be used in a specific case. In this case, their meanings need to be given in the detailed description. Hence, the terms must be defined based on their meanings and the contents of the entire specification, not by simply stating the terms.

The terms "comprises" and/or "comprising" or "includes" and/or "including" when used in this specification, specify the presence of stated elements, but do not preclude the presence or addition of one or more other elements. The terms "unit", "-er (-or)", and "module" when used in this specification refers to a unit in which at least one function or operation is performed, and may be implemented as hardware, software, or a combination of hardware and software.

Throughout the disclosure, the expression "at least one of a, b or c" indicates only a, only b, only c, both a and b, both a and c, both b and c, all of a, b, and c, or variations thereof.

Examples are described in detail herein with reference to the accompanying drawings so that this disclosure may be easily performed by one of ordinary skill in the art to which the disclosure pertain. The disclosure may, however, be embodied in many different forms and should not be construed as being limited to the examples set forth herein. In the drawings, parts irrelevant to the description are omitted for simplicity of explanation, and like numbers refer to like elements throughout.

FIG. 1 is a diagram schematically illustrating a method, performed by an electronic device, of providing a voice recognition service, according to an embodiment.

According to an embodiment, an electronic device 1000 may include a wake-up recognition module, a text to speech (TTS) module, an automatic speech recognition (ASR) module, and a natural language understanding (NLU) model, and the like. For example, the wake-up recognition module may be a module for providing a wake on voice (WOV) service, and thus may activate a voice recognition service by recognizing a call keyword included in an audio signal including a user voice. The wake-up recognition module may reduce power consumption caused due to a regular operation of the voice recognition service and may prevent a mal-function caused due to misrecognition of a user voice.

The ASR module may receive a user voice and may convert the received user voice to text. According to an embodiment, the ARS module may convert the received user voice to text by identifying an acoustic feature that is represented by each phoneme of the user voice. The NLU model may receive the text into which the user voice has been converted, and may output intention information about the intention of a user included in the user voice or slot information that determines a conversation element necessary for completing a response operation matched with the intention of the user by analyzing the received text in a grammatical unit (e.g., a word, a phrase, or a morpheme).

The TTS module may receive text such as a call keyword from a user, and may convert the received text into information in a speech format, based on an utterance feature of a speaker. A process in which the electronic device 1000 activates a voice recognition service, based on a user-customized call keyword will now be described by focusing on the wake-up recognition module and the TTS module.

The electronic device 1000 may obtain an audio signal including a user voice from a user 10, and may activate a voice recognition service by recognizing a first call keyword 102 such as "Hi Bixby" included in the audio signal by using the wake-up recognition module.

According to an embodiment, the electronic device 1000 may change the first call keyword 102 such as "Hi Bixby" to a second call keyword 104 such as a user-customized "Saebomi", and may activate the voice recognition service, based on the second call keyword 104. The wake-up recognition module used by the electronic device 1000 to activate the voice recognition service may include a neural network based model for providing a WOV service.

Examples of the electronic device 1000 may include, but are not limited to, a smartphone, a tablet personal computer (PC), a PC, a smart television (TV), a mobile phone, a personal digital assistant (PDA), a laptop, a media player, a server, a micro-server, a global positioning system (GPS) device, an electronic book terminal, a digital broadcasting terminal, a navigation device, a kiosk, an MP3 player, a digital camera, a speaker, and other mobile or non-mobile computing devices, each of which includes an artificial intelligence (AI) program mounted thereon and has an ASR function.

According to an embodiment, the electronic device 1000 may recognize a voice of a user within an audio signal or activate a voice recognition service by interoperating with a server 2000 connected to the electronic device 1000 via a network, or activate a voice recognition service. According to an embodiment, the network may include a local area network (LAN), a wide area network (WAN), a value added network (VAN), a mobile radio communication network, a satellite communication network, and a combination thereof. The server 2000 connected to the electronic device 1000 via the network may include at least one other electronic device capable of communicating with the electronic device 1000.

According to an embodiment, the electronic device 1000 may obtain a call keyword, based on a user input (operation S106), and may obtain a user-customized voice database (DB) (operation S115), by inputting the obtained call keyword, an initial call keyword voice DB 110, and a TTS DB 112 to the TTS module (operation S114). The initial call keyword voice DB 110 may include user voice signals pre-stored by the user in order to activate a voice recognition service of the electronic device 1000. The TTS DB 112 may include a voice model representing the acoustic features of a plurality of speakers.

The electronic device 1000 may generate a WOV model by using user-customized feature vectors that are output by inputting the audio signals of the user-customized voice DB to a pre-trained wake-up recognition module (operation S116). The WOV model may include a plurality of user-customized feature vectors output by the electronic device 1000 inputting the audio signals of the user-customized voice DB to the wake-up recognition module.

For example, the electronic device 1000 may activate the voice recognition service, based on a result of a comparison between a user-customized feature within the WOV model and an output value of the wake-up recognition module for an audio signal including a newly-received user voice. When the voice recognition service is activated, the electronic device 1000 may recognize the user voice included in the audio signal by using the ASR module.

FIG. 2 is a flowchart of a method, performed by an electronic device, of providing a voice recognition service, based on a user call keyword, according to an embodiment.

In operation S210, the electronic device 1000 may obtain a user call keyword, based on a user voice input. For example, the electronic device 1000 may obtain a voice of a user through a microphone of the electronic device 1000. According to an embodiment, the electronic device 1000 may obtain a call keyword in a text format through a user input interface of the electronic device 1000 rather than a user voice input. A method in which the electronic device 1000 obtains the call keyword is not limited thereto, and the electronic device 1000 may obtain the call keyword via any of other user input obtaining methods for inputting a keyword.

In operation S220, the electronic device 1000 may obtain a user-customized voice DB by inputting the call keyword to a TTS module. The TTS module may compare an acoustic pattern of the obtained call keyword with reference acoustic patterns within a TTS DB to thereby output voice signals corresponding to a most similar reference acoustic pattern from among the reference acoustic patterns.

In more detail, the electronic device 1000 may generate the user-customized voice DB by using the audio signals output by the TTS module. In other words, the user-customized voice DB may include a plurality of audio signals output by inputting call keywords obtained based on user inputs to the TTS module. According to an embodiment, the TTS module may be a personalized TTS module that is pre-trained for each user, based on acoustic features of a user of the electronic device 1000.

For example, a related art TTS module receives text and outputs only an audio signal according to an acoustic feature initially set in the DB of the TTS module. However, a TTS module according to an embodiment may be trained to output an audio signal corresponding to a specific keyword, based on acoustic factors representing acoustic features such as a tone, intensity, pitch, formant frequency, speech speed, and voice quality of a user voice that utters the specific keyword, and accordingly may output an audio signal in which the acoustic feature of a specific user is properly reflected.

For example, a case is assumed in which the electronic device 1000 according to an embodiment is used on the assumption that a speaker A and a speaker B are included as members. The speaker A and the speaker B uttering a specific call keyword may have different acoustic features. For example, it is assumed that, when the speaker A utters a specific character X, the intensity of the uttered voice is 60 decibels and the formant frequency thereof is 4 KHz, and, when the speaker B utters the specific character X, the intensity of the uttered voice is 70 decibels and the formant frequency thereof is 4.5 KHz.

When the electronic device 1000 obtains a call keyword 'play a movie' in a text format from the speaker A, the electronic device 1000 may input a text 'play a movie' to the TTS module pre-trained to output an audio signal in which the acoustic features of the speaker A (for example, a voice intensity of 60 decibels and a formant frequency of 4 KHz) have been reflected, when text is input, to thereby obtain audio signals in which the acoustic features of the speaker A (for example, a voice intensity of 60 decibels and a formant frequency of 4 KHz) have been reflected, and may generate a user-customized voice DB by using the obtained audio signals. Thus, the user-customized voice DB generated using the TTS module trained to output the audio signal in which the acoustic features of the speaker A have been reflected includes a plurality of audio signals according to the acoustic features of the speaker A.

As will be described later with reference to FIG. 3, the electronic device 1000 may complete a call keyword registration process for a call keyword such as 'play a movie' by inputting a plurality of audio signals according to the acoustic feature of the speaker A, which are included in a generated user-customized voice DB, to a wake-up recognition module and storing, in a memory of the electronic device 1000, a user-customized model in which the acoustic feature of the speaker A has been reflected, the user-customized model including user-customized features output by the wake-up recognition module.

In other words, because the electronic device 1000 generates a user-customized voice model by using the TTS module trained to output the audio signal in which the acoustic feature of the speaker A has been reflected, the call keyword such as 'play a movie' may be registered by reflecting up to the acoustic feature of the speaker A. Accordingly, according to the aforementioned embodiment, even when the electronic device 1000 obtains an audio signal that is recognizable as 'play a movie' from the speaker B after completing registration of the call keyword such as 'play a movie', when it is determined that different people speak the call keyword such as 'play a movie', based on a result of a comparison between a speaker feature of an output value of the wake-up recognition module for the obtained audio signal and a speaker feature within the user-customized feature of the user-customized voice model in which the acoustic feature of the speaker A has been reflected, the electronic device 1000 might not activate the voice recognition service and consequently might not provide a responding operation for the call keyword.

Electronic devices that provide a related art voice recognition service obtain a voice of a user several times in order to register a call keyword for activating a voice recognition service, or activate a voice recognition service, based on only keywords within a pre-stored call keyword list. However, the electronic device 1000 according to an embodiment may obtain a plurality of audio signals by inputting an obtained call keyword to the TTS module even when the obtained call keyword is input in a text format, and thus there is no need to obtain a plurality of voices from a user, consequently improving the user convenience.

Because the electronic device 1000 uses a personalized TTS module as described above, the electronic device 1000 may actually obtain the same effect as directly obtaining a voice a plurality of times from a user who utters a call keyword input in a text format, even when the electronic device 1000 receives only a call keyword in a text format.

In operation S230, the electronic device 1000 may obtain a user-customized feature by inputting the audio signals within the user-customized voice DB to the pre-trained wake-up recognition module. For example, the electronic device 1000 may obtain the user-customized feature by distinguishing the audio signals within the user-customized voice DB in units of frames and inputting the audio signals distinguished in units of frames to a wake-up recognition module. According to an embodiment, the user-customized features may be obtained in a vector format by inputting the audio signals within the user-customized voice DB to the wake-up recognition module.

According to an embodiment, the electronic device 1000 may generate a user-customized voice model by using the user-customized features obtained in a vector format by inputting the audio signals within the user-customized voice DB to the wake-up recognition module. The user-customized voice model may include a plurality of user-customized features in the vector format that are output by inputting the audio signals output by the TTS module to the wake-up recognition module. The electronic device 1000 may store the user-customized voice model in the memory of the electronic device 1000, and, when a new audio signal is obtained from a user, the electronic device 1000 may compare an output value of the wake-up recognition module for the obtained new audio signal with the user-customized features within the user-customized voice model to thereby determine whether to activate a voice recognition service.

Figure 3:
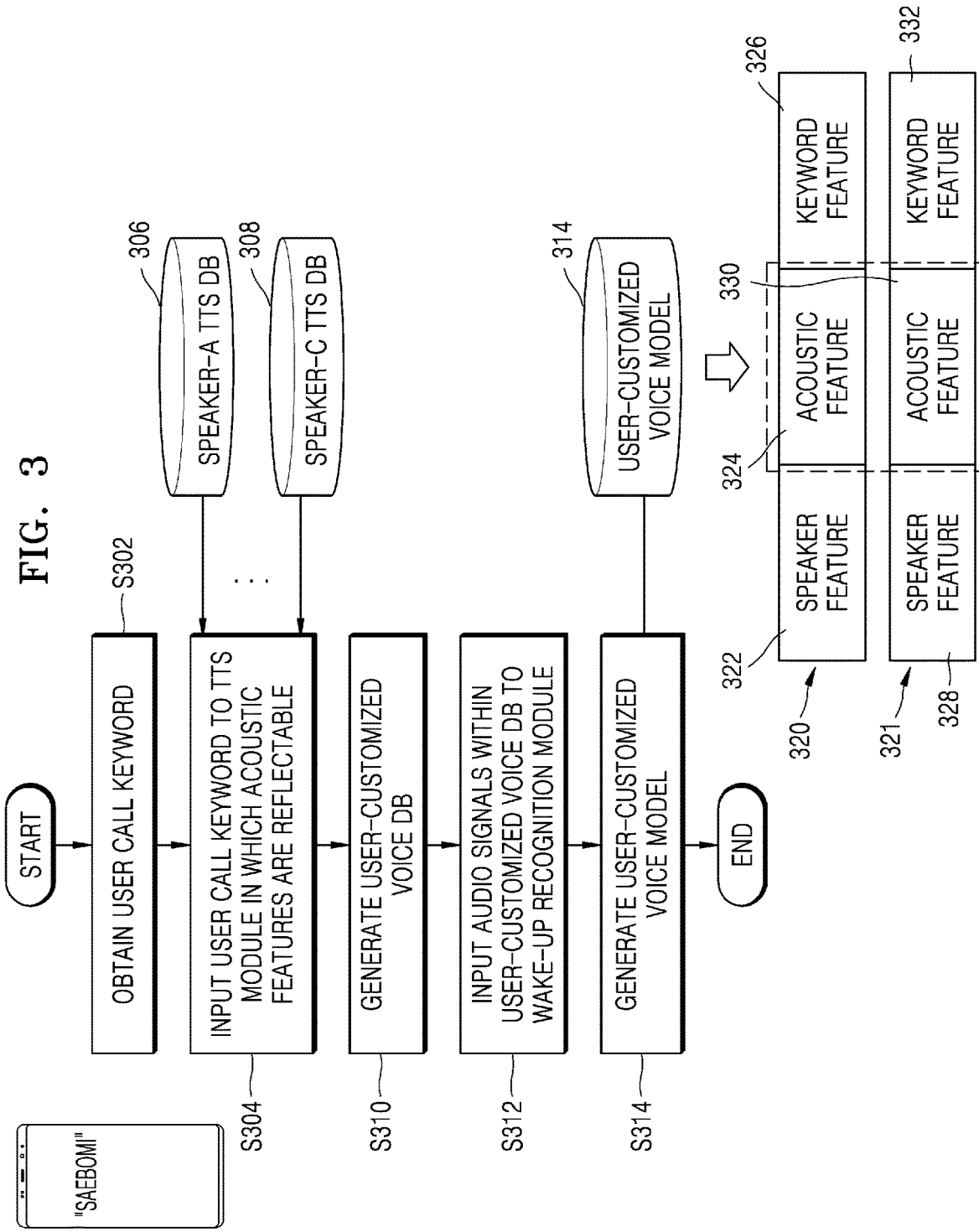
FIG. 3 is a diagram for describing a process, performed by an electronic device, of registering a call keyword, based on a user input, according to an embodiment.

FIG. 3 is a diagram for describing a process, performed by an electronic device, of registering a call keyword, based on a user input, according to an embodiment.

In operation S302, the electronic device 1000 may obtain a user call keyword from a user. According to an embodiment, the electronic device 1000 may register a new call keyword, based on a user call keyword input in a text format, without needing to obtain a plurality of audio signals from the user, in contrast with an electronic device that provides a related art voice recognition service.

In operation S304, the electronic device 1000 inputs the user call keyword input from the user to a TTS module. For example, the TTS module may generate audio signals corresponding to the user call keyword, based on a speaker-A TTS DB 306 or speaker-C TTS DB 308 pre-stored within the TTS module.

The speaker-A TTS DB 306 or the speaker-C TTS DB 308 may include a voice model in which acoustic features (for example, a pitch, an intensity, a speech speed, and a waveform) of each speaker have been reflected. A TTS model according to an embodiment may include more speaker feature TTS DBs according to the performance of the TTS model, and embodiments of the disclosure are not limited to the speaker-A TTS DB 306 or the speaker-C TTS DB 308.

In operation S310, the electronic device 1000 may generate a user-customized voice DB by using the audio signals that are output by inputting the user call keyword to the TTS module. In operation S314, the electronic device 1000 may generate a user-customized voice model 314, based on a plurality of user-customized features that are output by inputting the audio signals within the user-customized voice DB to a wake-up recognition module in operation S312. According to an embodiment, the wake-up recognition module may output user-customized features in a vector format, and the electronic device 1000 may generate the user-customized voice model 314 by using the user-customized features output in the vector format by inputting the audio signals within the user-customized voice DB to the wake-up recognition module.

The electronic device 1000 may register the user call keyword newly input by the user as a new call keyword for activating a voice recognition service within the electronic device 1000, by storing the generated user-customized voice model 314 in the memory of the electronic device 1000. According to an embodiment, the user-customized voice model 314 may include a plurality of user-customized features in vector formats output by the wake-up recognition module.

User-customized features 320 and 321 may include speaker features 322 and 328 for identifying a speaker of an audio signal, acoustic features 324 and 330 of the speaker who utters the audio signal, or keyword features 326 and 332 for identifying a keyword included in the audio signal, respectively. According to an embodiment, the user-customized features 320 and 321 might not include the acoustic features 324 and 330 according to the structure of the wake-up recognition module mounted on the electronic device 1000.

In other words, the electronic device 1000 may set a user call keyword input by a user as a new call keyword for activating a voice recognition service of the electronic device 1000 by using the TTS module and the wake-up recognition module, and the operation of the electronic device 1000 of setting the new call keyword to activate the voice recognition service may correspond to an operation of generating a user-customized voice model corresponding to a call keyword input in a text format by the user.

The voice recognition service that the electronic device 1000 provides may include both an ASR service for automatically recognizing a voice of a user and a WOV service for activating the ASR service, in order to provide a response message to the user like a person directly talking with the user in consideration of a situation of the user, a situation of the electronic device 1000, and the like. However, according to an embodiment, the voice recognition service that the electronic device 1000 provides may mean only a WOV service for activating an ASR service for performing a specific function of the electronic device 1000.

The electronic device 1000 may recognize a voice of a user through a voice recognition service, and may provide a broadcasting service, a content sharing service, a content providing service, a power management service, a game providing service, a chatting service, a document writing service, a search service, a calling service, a photographing service, a transportation recommendation service, and a moving picture playback service, based on the recognized voice of the user. However, the types of services providable by the electronic device 1000 through a voice recognition service are not limited to the aforementioned services.

Figure 4:
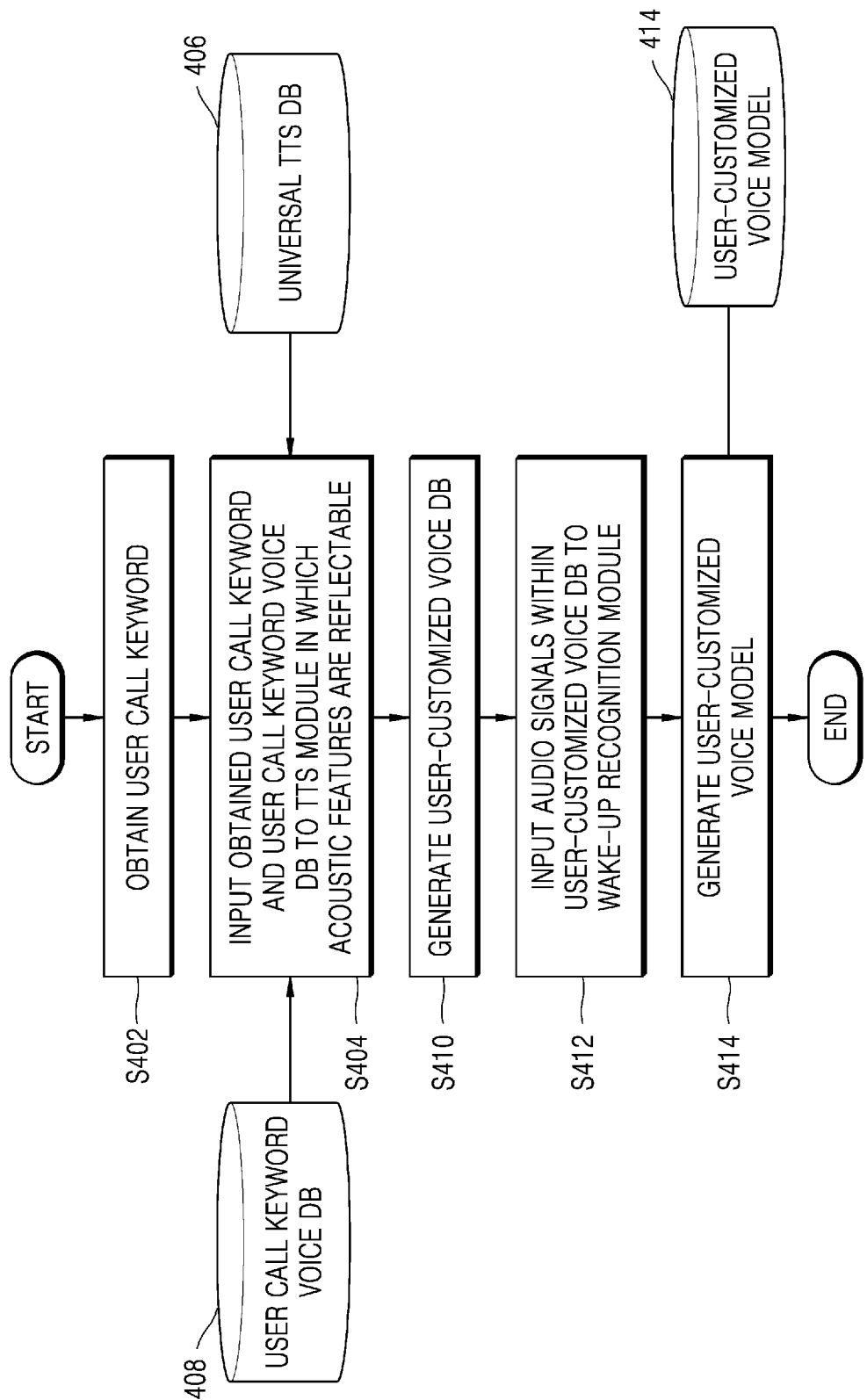
FIG. 4 is a flowchart of a process, performed by an electronic device, of registering a call keyword, based on a user input, according to an embodiment.

FIG. 4 is a flowchart of a process, performed by an electronic device, of registering a call keyword, based on a user input, according to an embodiment.

According to an embodiment, the electronic device 1000 may register a new call keyword, based on a user call keyword input in a text format and a user call keyword voice DB 408. In other words, as shown in FIG. 3, the electronic device 1000 may register the new call keyword by using only a newly obtained user call keyword, but may register the new call keyword by further using the user call keyword voice DB 408 in addition to the user call keyword. The user call keyword voice DB 408 may include audio signals of a user relating to a call keyword, which have been previously registered in the electronic device 1000 in order to activate the voice recognition service of the electronic device 1000, before operation S402 is performed.

Accordingly, the electronic device 1000 may generate a new user-customized voice model in which acoustic features represented by the audio signals of the user previously registered while the user is uttering a call keyword, before operation S402 is performed, by using the pre-stored user call keyword voice DB 408. A process in which a user generates a user-customized voice model related to a new call keyword by using the user call keyword voice DB 408 stored in the electronic device 1000 will now be described in detail.

In operation S402, the electronic device 1000 may obtain a user call keyword from a user. Because operation S402 may correspond to operation S302 of FIG. 3, a repeated description thereof will be omitted. In operation S404, the electronic device 1000 may input the user call keyword obtained from the user and the user call keyword voice DB 408 stored in the electronic device 1000 to a TTS module in which acoustic features may be reflected. When the electronic device 1000 inputs the user call keyword and an audio signal of the pre-stored user call keyword voice DB 408 to the TTS module, the TTS module may generate audio signals corresponding to the user call keyword, in which the acoustic features of the audio signals within the user call keyword voice DB 408 have been reflected, based on a universal TTS DB 406 stored in the TTS module.

The universal TTS DB 406 may include a voice model obtained by modeling the acoustic features (for example, a pitch, an intensity, a speech speed, and a waveform) of related art speakers. In other words, the TTS module according to an embodiment may generate the audio signals corresponding to the user call keyword, based on the universal TTS DB 406 in which the acoustic features of related art speakers have been reflected. Accordingly, the TTS module may generate the audio signals corresponding to the user call keyword, in which the acoustic features represented by the audio signals of the user call keyword voice DB 408 within the electronic device 1000 have been properly reflected.

In operation S410, the electronic device 1000 may generate a user-customized voice DB by using audio signals output by the TTS module, the audio signals corresponding to the user call keyword. In operation S414, the electronic device 1000 may generate a user-customized voice model 414, based on a plurality of user-customized features that are output in vector formats by inputting the audio signals within the user-customized voice model DB 414 to a pre-stored wake-up recognition module in operation S412.

The electronic device 1000 may register the user call keyword newly obtained from the user in operation S402 as a new call keyword for activating a voice recognition service within the electronic device 1000, by storing the generated user-customized voice model 414 in the memory of the electronic device 1000. According to an embodiment, the user-customized voice model 414 generated by the electronic device 1000 may include a plurality of user-customized features in the vector formats in which the acoustic features of the user within the user call keyword voice DB 408 have been properly reflected.

Accordingly, the electronic device 1000 including the user-customized voice model 414 may determine whether to activate a voice recognition service, based on whether the audio signal newly received from the user includes a newly registered call keyword, and may verify whether the user who utters the audio signal is the same as a user who has registered the call keyword.

In other words, the electronic device 1000 may more effectively provide a voice recognition service by simultaneously performing an operation of determining whether to activate the voice recognition service, an operation of identifying a user who uttered an audio signal, and an operation of verifying the identified user, in contrast with related art electronic devices that separately perform an operation of determining whether to activate a voice recognition service, an operation of identifying a user who uttered an audio signal, and an operation of verifying the identified user.

The user-customized features within the user-customized voice model 414 of FIG. 4 may correspond to a structure of the user-customized feature vectors within the user-customized voice model 314 of FIG. 3, and thus redundant descriptions thereof will be omitted.

Figure 5:
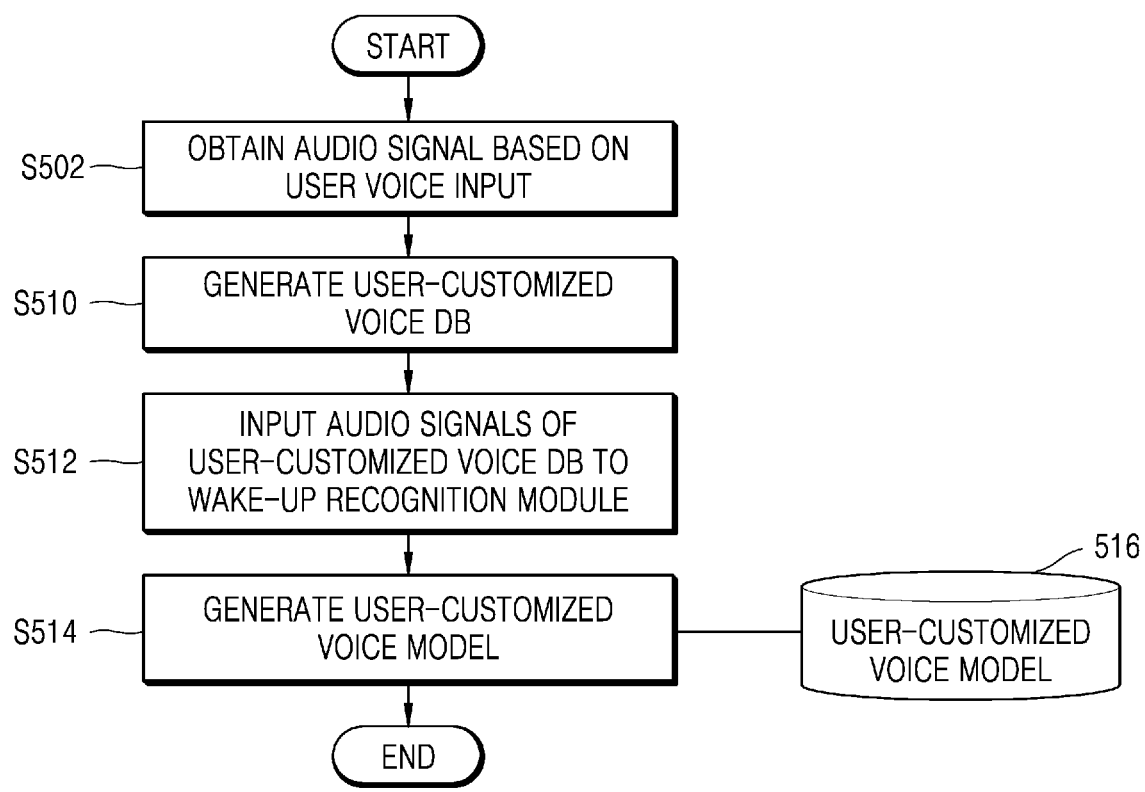
FIG. 5 is a flowchart of a process, performed by an electronic device, of registering a call keyword, based on a user input, according to an embodiment.

FIG. 5 is a flowchart of a process, performed by an electronic device, of registering a call keyword, based on a user input, according to an embodiment.

In operation S502, the electronic device 1000 may obtain an audio signal from a user, based on a user voice input. For example, the electronic device 1000 may obtain a user call keyword in a vector format from the user, as shown in FIGS. 3 and 4, but, like an electronic device that provides a related art voice recognition service, may obtain the user call keyword in an audio format from the user and may register the user call keyword obtained in an audio format as a new call keyword for activating a voice recognition service.

In operation S510, the electronic device 1000 may generate a user-customized voice DB by using an audio signal obtained from the user. For example, the electronic device 1000 may obtain a user voice from the user a plurality number of times, and may generate the user-customized voice DB by using audio signals including the obtained user voices. In operation S512, the electronic device 1000 may input the audio signals of the user-customized voice DB to a wake-up recognition module. The electronic device 1000 may obtain a plurality of user-customized features by inputting the audio signals of the user-customized voice DB to the wake-up recognition module. According to an embodiment, the wake-up recognition module may output user-customized features in the vector formats corresponding to the received audio signals. In operation S514, the electronic device 1000 may generate a user-customized voice model 516 by using the user-customized features output by the wake-up recognition module.

The electronic device 1000 may register a call keyword obtained in an audio format from the user as a new call keyword for activating a voice recognition service, by storing the generated user-customized voice model 516 in the memory of the electronic device 1000. The user-customized voice model 516 may include a plurality of user-customized features, and the plurality of user-customized features within the user-customized voice model 516 may be represented in vector formats. The user-customized features in the vector formats may correspond to the user-customized features 320 and 321 of FIGS. 3 and 4, and thus a detailed description thereof will be omitted.

Figure 6:
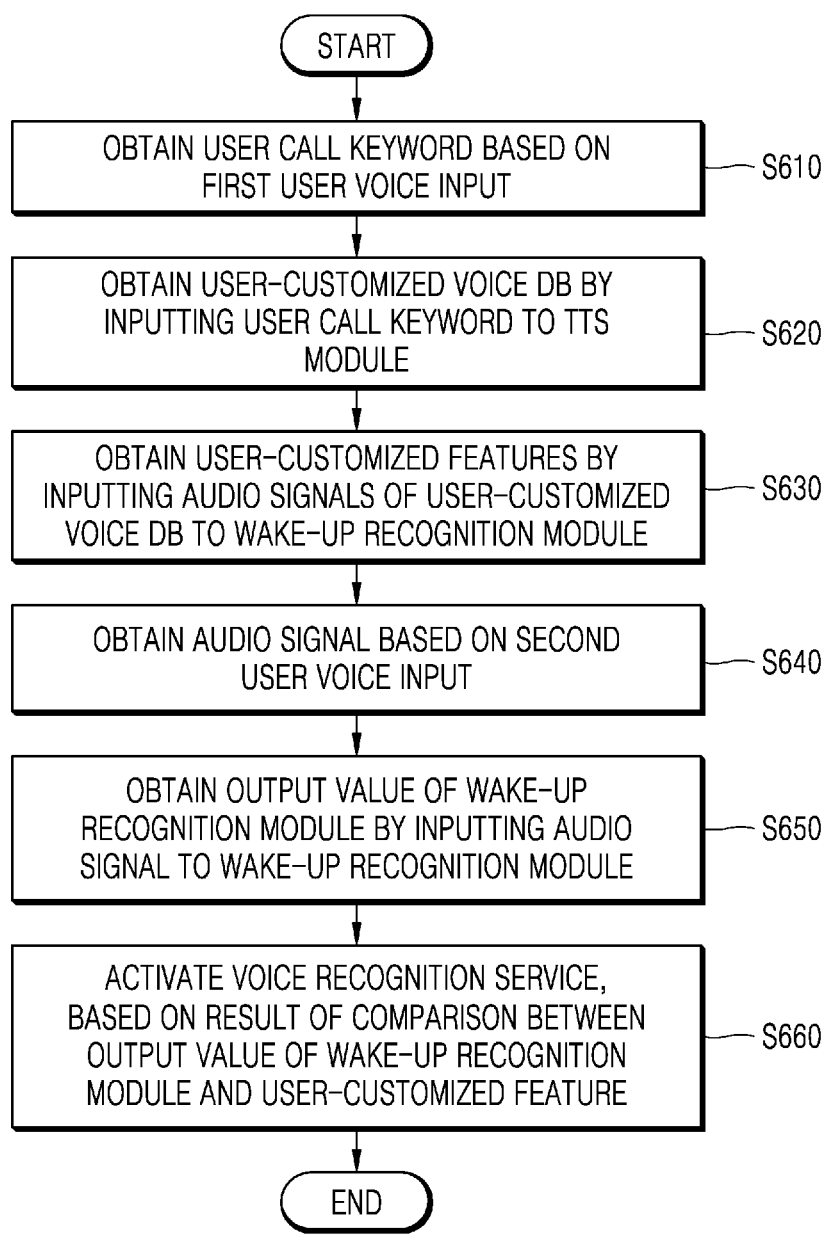
FIG. 6 is a flowchart of a method, performed by an electronic device, of providing a voice recognition service, according to an embodiment.

FIG. 6 is a flowchart of a method, performed by an electronic device, of providing a voice recognition service, according to an embodiment.

In operation S610, the electronic device 1000 may obtain a user call keyword, based on a first user voice input. According to an embodiment, the first user voice input may be a voice input obtained via the user input interface of the electronic device 1000 in order to obtain a user-customized feature from a user, before a second user voice input. According to an embodiment, the electronic device 1000 may obtain a call keyword in a text format through the user input interface of the electronic device 1000 rather than a user voice input. Operation S610 may correspond to the operation of the electronic device 1000 of FIG. 4 of obtaining the user call keyword, and thus a detailed description thereof will be omitted.

In operation S620, the electronic device 1000 may obtain a user-customized voice DB by inputting the call keyword to a TTS module. The TTS module may be used to change the audio signals of the user-customized voice DB, based on at least one acoustic feature for uttering the call keyword that is obtained from a speaker voice model including the acoustic features of a plurality of speakers. Operation S620 may correspond to the operation of the electronic device 1000 of FIG. 4 of obtaining the user-customized voice DB, and thus a detailed description thereof will be omitted.

In operation S630, the electronic device 1000 may obtain user-customized features by inputting the audio signals of the user-customized voice DB to a wake-up recognition module. According to an embodiment, the electronic device 1000 may obtain user-customized features in vector formats from the wake-up recognition module. The electronic device 1000 may store the obtained user-customized features in the memory of the electronic device 1000. The electronic device 1000 may register the user call keyword obtained in operation S610 as a new call keyword for activating a voice recognition service of the electronic device 1000, by storing the user-customized features obtained based on the first user voice input in the memory of the electronic device 1000. Operation S630 may correspond to the operation of the electronic device 1000 of FIG. 4 of obtaining the user-customized features to generate the user-customized voice DB, and thus a detailed description thereof will be omitted.

In operation S640, the electronic device 1000 may obtain an audio signal, based on the second user voice input. According to an embodiment, the electronic device 1000 may obtain the audio signal, based on the second user voice input, after registering the user call keyword obtained based on the first user voice input in operation S610 in the memory. According to an embodiment, the electronic device 1000 may obtain the audio signal, based on the second user voice input, and divide the obtained audio signal in units of frames, thereby obtaining audio signals corresponding to a plurality of frames.

For example, the electronic device 1000 may determine a window length of a window, overlap windows of the determined window length at regular intervals, and may split an audio signal into a plurality of frames by using the windows overlapped at regular intervals.

According to an embodiment, the second user voice input may include a voice input of the user that is obtained through the microphone of the electronic device 1000.

According to an embodiment, a window that the electronic device 1000 uses is a band-pass filter, and thus may be used to remove noise included in a frequency component of both side edges within a frame. The electronic device 1000 may provide a voice recognition service, based on a context between consecutive frames by simultaneously inputting a plurality of frames to a wake-up recognition module based on a multi-dimension artificial neural network within a certain time period. However, a method, performed by the electronic device 1000, of obtaining an audio signal is not limited to the above-described method, and the electronic device 1000 may obtain an audio signal in a continuous state that is not divided in units of frames.

In operation S650, the electronic device 1000 may obtain an output value of the wake-up recognition module from the wake-up recognition module, by inputting the audio signal obtained based on the second user voice input to the wake-up recognition module. According to an embodiment, the wake-up recognition module used by the electronic device 1000 may include a wake-up recognition model including a shared layer to which audio features extracted from consecutive frames within a certain section from among the plurality of frames obtained based on the second user voice input are simultaneously input, a speaker identification layer for identifying a speaker feature of the audio signal when a frame unit representation output by the shared layer is input, an acoustic feature identification layer for identifying the acoustic feature of the audio signal, and a keyword identification layer for identifying a keyword feature included in the audio signal. According to an embodiment, an output value of the wake-up recognition module used by the electronic device 1000 may include the keyword feature, the speaker feature or the acoustic features represented based on a segment unit representation output by the keyword identification layer, the speaker identification layer, or the acoustic feature identification layer. Detailed contents related to a structure and a training method of a wake-up recognition model within the wake-up recognition module used by the electronic device 1000 will be described later with reference to FIGS. 7 through 9.

In operation S660, the electronic device 1000 may activate the voice recognition service, based on a result of a comparison between an output value of the wake-up recognition module for the audio signal including the second user voice input uttering the registered call keyword and the user-customized feature within the memory of the electronic device 1000. For example, the electronic device 1000 completes call keyword registration by storing, in the memory, the user-customized feature of the user call keyword obtained based on the first user voice input in operation S630, and then obtains a new audio signal from the user who utters a registered call keyword, based on the second user voice input, in operation S640. The electronic device 1000 may determine a similarity score related to similarity between an output value of the wake-up recognition module for the newly obtained audio signal and the user-customized feature, and may determine whether to activate the voice recognition service, based on whether the determined similarity score is greater than or equal to a preset first threshold value. According to an embodiment, the electronic device 1000 may activate the voice recognition service when the determined similarity score is greater than or equal to the preset first threshold value.

In the above-described embodiment, the electronic device 1000 compares the user-customized feature related to the user call keyword obtained based on the first user voice input with the output value of the wake-up recognition module for the new audio signal obtained based on the second user voice input. However, according to an embodiment, the electronic device 1000 may determine the similarity score, based on a result of a comparison between a user-customized feature vector in which the user-customized feature is expressed in a vector format and the output value of the wake-up recognition module in which the audio signal obtained based on the second user voice input is expressed in a vector format. A detailed method, performed by the electronic device 1000, of comparing the output value of the wake-up recognition module for the newly obtained audio signal with the user-customized feature vector will be described later with reference to FIGS. 10 and 11.

Figure 7:
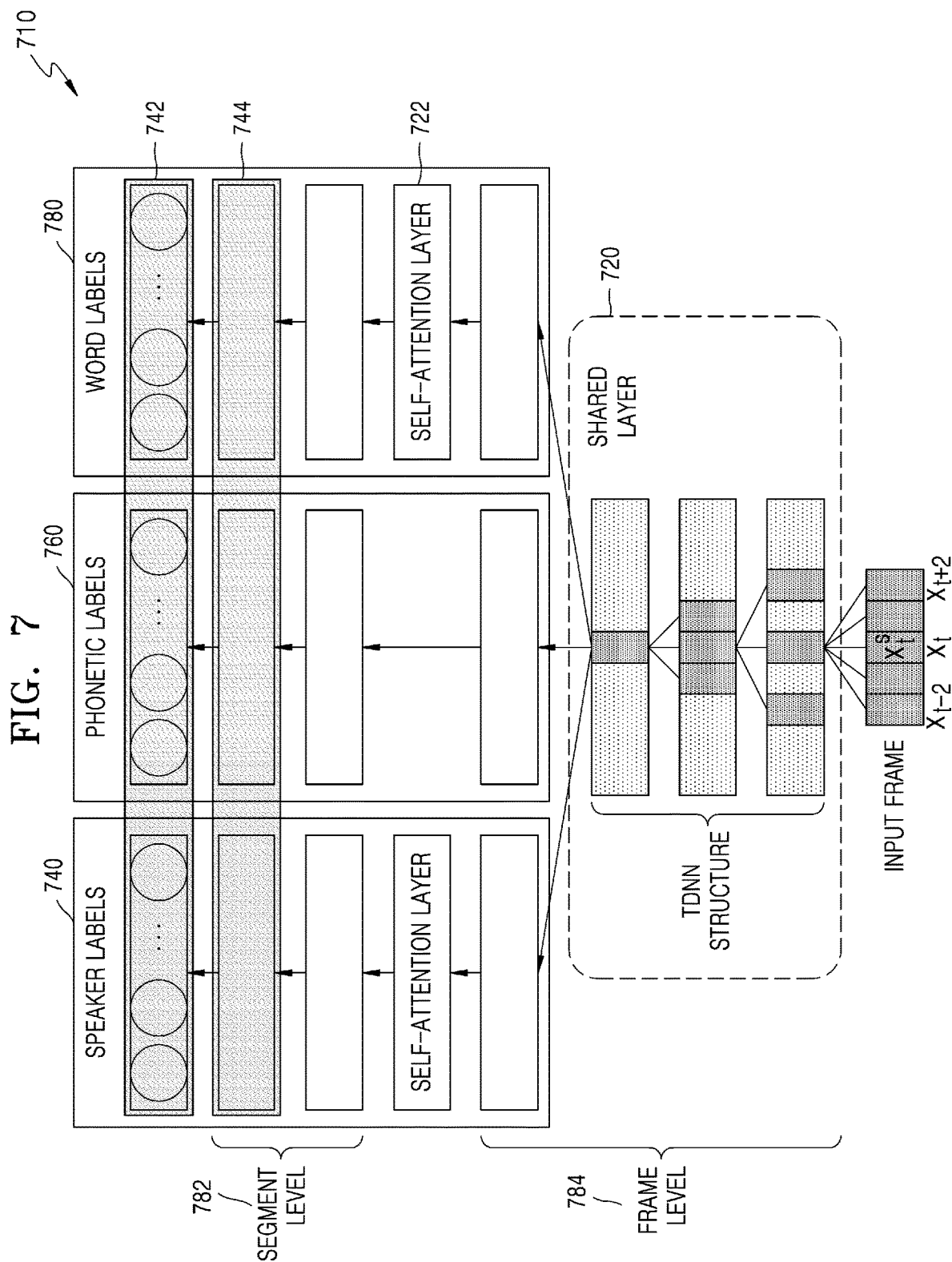
FIG. 7 is a diagram for describing a training method and a structure of a wake-up recognition model within a wake-up recognition module that is used by an electronic device to provide a voice recognition service, according to an embodiment.

FIG. 7 is a diagram for describing a training method and a structure of a wake-up recognition model within a wake-up recognition module that is used by an electronic device to provide a voice recognition service, according to an embodiment.

A wake-up recognition module used by the electronic device 1000 to provide a voice recognition service may provide a WOV technique of activating the voice recognition service, based on a call keyword customized by a user. The wake-up recognition module used by the electronic device 1000 may obtain an audio signal from the user, extract an audio feature for each frame of the obtained audio signal, and determine, as an output value of the wake-up recognition module, an output signal of a wake-up recognition model obtained by inputting the audio feature for each frame into the wake-up recognition model. The electronic device 1000 may determine whether to activate the voice recognition service, based on the output value of the wake-up recognition module. In other words, the wake-up recognition model may be a DB including a plurality of nodes, layers including the plurality of nodes, attention related to a connection strength of the layers, and feature values output from the plurality of nodes and the layers.

For example, the wake-up recognition model within the wake-up recognition module used by the electronic device 1000 may be trained according to a multi-task training method of learning a plurality of tasks together. According to an embodiment, the wake-up recognition model used by the electronic device 1000 may be trained via a multi-task training method of serving, as tasks, keyword identification based on a keyword feature included in the audio signal, speaker identification based on a speaker feature, or acoustic feature identification of a speaker who utters the audio signal. Multi-task training is performed to increase generalization performance between tasks having similar characteristics, and assumes that there is a correlation between all tasks. In the multi-task training, separate tasks may be simultaneously learned to partially share their respective pieces of information, thereby constituting a reliable learning model.

Referring to FIG. 7, a wake-up recognition model 710 within the wake-up recognition module used by the electronic device 1000 is a neural network based model, and may include a plurality of nodes and a plurality of layers including the plurality of nodes and may be trained by modifying and refining attention related to a connection strength between the layers. The wake-up recognition model 710 may include a shared layer 720 to which audio features extracted from consecutive frames within a certain time section from among a plurality of frames of an audio signal are input together, a speaker identification layer 740 for identifying a speaker feature of the audio signal in response to a frame unit representation output by the shared layer 720, an acoustic feature identification layer 760 for identifying the acoustic feature of the audio signal, and a keyword identification layer 780 for identifying a keyword feature included in the audio signal.

According to an embodiment, the shared layer 720 may receive frames together within a certain time section from among the plurality of frames of the audio signal, and may output a frame unit representation by using audio features extracted from the received frames. According to an embodiment, each frame may include audio features of an m-dimension. For example, the audio features within a frame may represent the magnitude of a complex number component for each frequency component of an audio signal converted to a frequency domain. A method, performed by the shared layer 720 of outputting a frame unit representation, based on the audio features extracted from the plurality of frames will be described in detail later with reference to FIG. 8.

According to an embodiment, because the shared layer 720 outputs a frame unit representation by using further the audio feature of a previous frame and the audio feature of a frame after a particular time period in addition to an audio feature output at a frame at the particular time period, the shared layer 720 may maintain the context of the audio signal while being trained. The context may represent an acoustic meaning indicated by a relationship between the audio features within a frame. According to an embodiment, the shared layer 720 may be provided as a time delay neural network (TDNN) that receives the frames of a continuous audio signal together, in order to maintain a context meaning representing a relationship between the audio features of a frame.

The speaker identification layer 740 may determine a probability value that a speaker feature within the audio signal is to correspond to a speaker label. For example, the speaker identification layer 740 may obtain the frame unit representation from the shared layer 720 on a frame level 784, apply attention to frame unit representations by using a self-attention layer 722, and determine a segment unit representation being a unit representation on a segment level 782 by weighted-summing the frame unit representations to which the attention has been applied.

The speaker identification layer 740 may output, as the speaker feature, the segment unit representation generated based on the frame unit representations. The speaker identification layer 740 may include, as an output layer, a soft max layer that outputs a probability value that segment unit representations obtained by weighted-summing the frame unit representations are to correspond to a certain speaker label. For example, the speaker identification layer 740 may output the frame unit representations weighted-summed by the self-attention layer 722 as probabilities for respective nodes corresponding to the speaker A and the speaker B.

The acoustic feature identification layer 760 may determine a probability value that an acoustic feature related to utterance of the audio signal is to correspond to a particular phonetic label. According to an embodiment, the acoustic feature may include a particular phoneme string and information about an acoustic feature corresponding to the particular phoneme string. According to an embodiment, the phoneme string used in training the acoustic feature identification layer 760 is a string of phonemes, and thus may be a triphone including three phonemes.

For example, the acoustic feature identification layer 760 may obtain a frame unit representation from the shared layer 720 on the frame level 784, and may input the obtained frame unit representation to a plurality of feed forward layers in which an activation function Rectified Linear Unit (ReLU) is activated. Each feed forward layer does not input an output of a hidden layer to the same hidden layer again, and may only input an output of a lower hidden layer to an upper hidden layer. The acoustic feature identification layer 760 may include, as an output layer, a soft max layer that outputs a probability value that the frame unit representations within the feed forward layers are correspond to a certain phonetic label.

The keyword identification layer 780 may determine a probability value that a keyword feature within the audio signal is to correspond to a word label. For example, the keyword identification layer 780 may obtain the frame unit representation from the shared layer 720 on the frame level 784, apply attention to frame unit representations by using the self-attention layer 722, and determine a segment unit representation being a unit representation on the segment level 782 by weighted-summing the frame unit representations to which the attention has been applied.

The keyword identification layer 780 may output, as the keyword feature, the segment unit representation generated based on the frame unit representations. The keyword identification layer 780 may include, as an output layer, a soft max layer that outputs a probability value that segment unit representations obtained by weighted-summing the frame unit representations are to correspond to a certain word label. For example, the keyword identification layer 780 may output the frame unit representations weighted-summed via the self-attention layer 722 as a probability value that is to correspond to a certain word label such as 'Hi Bixby' or 'Hello'.

According to an embodiment, the self-attention layer 722 may be included in at least one of the speaker identification layer 740, the acoustic feature identification layer 760, or the keyword identification layer 780. The self-attention layer 722 may set attention to the frame unit representations that are output by the shared layer 720. For example, the self-attention layer 722 may apply attention to the frame unit representations output by the shared layer 720, and output the speaker feature, the acoustic feature, or the keyword feature by weighted-summing the frame unit representations to which the attention has been applied.

According to an embodiment, the speaker identification layer 740, the acoustic feature identification layer 760, and the keyword identification layer 780 within the wake-up recognition model 710 are neural network based models, and thus may be trained by modifying and refining the plurality of nodes, the layers including the plurality of nodes, and the attention related to a connection strength between the layers.

Because the wake-up recognition model 710 used by the electronic device 1000 according to an embodiment further includes an acoustic feature identification layer that performs a task for identifying an acoustic feature related to utterance of an audio signal in addition to layers for respectively performing keyword identification and speaker identification, the accuracy of recognizing a keyword within the audio signal may be further improved. In other words, the electronic device 1000 according to an embodiment may improve the accuracy of recognizing a call keyword within an audio signal including a user voice by using a multi-task training and self-attention mechanism.

Because the wake-up recognition model 710 used by the electronic device 1000 according to an embodiment is not trained for only a keyword identification task but is trained according to a multi-task training method including a speaker identification task for an purpose in addition to a keyword identification task, the electronic device 1000 according to an embodiment may determine whether to activate a voice recognition service, based on whether a call keyword is included within the audio signal, and may verify whether a user who utters the audio signal is the same as a user who has registered the call keyword.

According to an embodiment, a structure of the wake-up recognition model 710 used by the electronic device 1000 to register a call keyword customized by a user and activate a voice recognition service may be different from a structure in a training process. For example, when training of the wake-up recognition model 710 through the multi-task training method is completed, the electronic device 1000 may provide a voice recognition service by using a wake-up recognition module including a wake-up recognition model obtained by removing the acoustic feature identification layer 760 for performing an acoustic feature identification task from the wake-up recognition model 710. After training of the wake-up recognition model 710 is completed, the electronic device 1000 may more accurately and more quickly recognize the call keyword within the audio signal by using the wake-up recognition module including the wake-up recognition model obtained by removing the acoustic feature identification layer 760 for performing an acoustic feature identification task from the wake-up recognition model 710. When the acoustic feature identification layer 760 within the wake-up recognition model 710 is removed, the format of an output value of the wake-up recognition model that is output by the wake-up recognition module may be changed.

According to an embodiment, when training of the wake-up recognition model 710 through the multi-task training method is completed, the electronic device 1000 may provide a voice recognition service by using a wake-up recognition module including a wake-up recognition model obtained by removing soft max layers 742 respectively included in the speaker identification layer 740, the acoustic feature identification layer 760, and the keyword identification layer 780 from the wake-up recognition model 710.

For example, the electronic device 1000 may provide a voice recognition service by not using a probability value that is to correspond to a particular speaker label, a particular phonetic label, or a particular word label respectively output by the speaker identification layer 740, the acoustic feature identification layer 760, or the keyword identification layer 780 but by using the speaker feature, the acoustic feature or the keyword feature output by a layer 744 immediately before the output layers (for example, the soft max layers 742) respectively included in the speaker identification layer 740, the acoustic feature identification layer 760, or the keyword identification layer 780.

In other words, after training of the wake-up recognition model 710 is completed, the electronic device 1000 may more accurately and more quickly recognize the call keyword within the audio signal by using a wake-up recognition model obtained by removing the soft max layer 742 (for example, the output layer) of the speaker identification layer 740, the acoustic feature identification layer 760, or the keyword identification layer 780 from the wake-up recognition model 710, instead of using a probability value that is to correspond to each label.

According to an embodiment, the electronic device 1000 may remove the acoustic feature identification layer 760 from the wake-up recognition model 710 for which training has been completed, and may provide a voice recognition service by using a wake-up recognition module including a wake-up recognition model obtained by removing the respective soft max layers 742 (for example, the output layers) of the speaker identification layer 740 and the keyword identification layer 780 from a wake-up recognition model resulting from the removal of the acoustic feature identification layer 760 from the wake-up recognition model 710.

Figure 8:
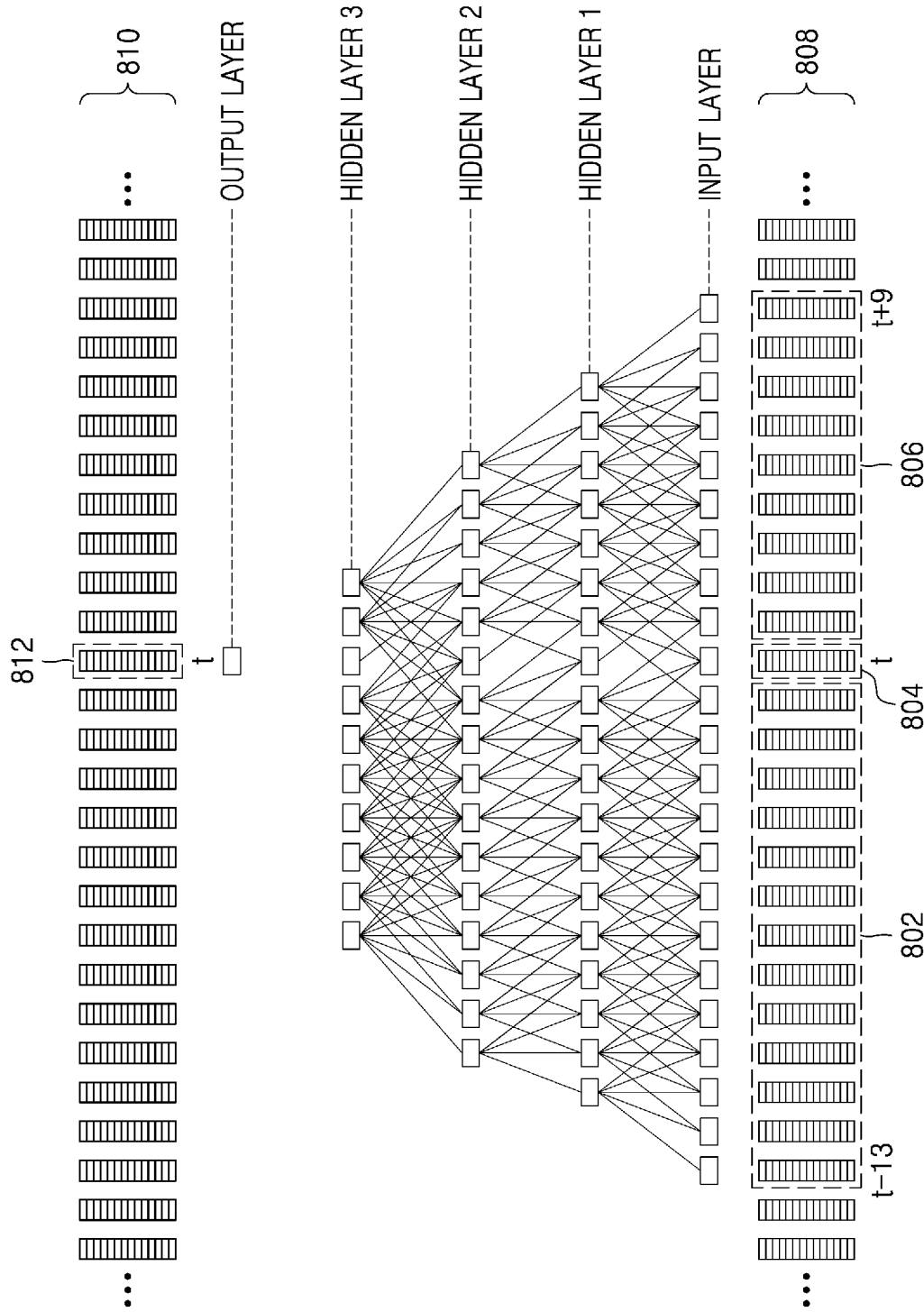
FIG. 8 is a diagram for describing a method of processing audio features for each frame in a shared layer of a wake-up recognition model, according to an embodiment.

FIG. 8 is a diagram for describing a method of processing audio features for each frame in a shared layer of a wake-up recognition model, according to an embodiment.

Referring to FIG. 8, the shared layer 720 within a wake-up recognition model may simultaneously receive audio features 808 extracted from certain frames within a specific time section. According to an embodiment, each frame may include the audio features of an m-dimension, and the audio features within each frame may represent the magnitude of a complex number component for each frequency component of an audio signal converted in a frequency domain. As described above with reference to FIG. 7, the shared layer 720 may be provided as a TDNN. The TDNN may use, for example, all of an audio feature 802 of (t−13)th to (t−1)th frames and an audio feature 806 of (t+1)th to (t+9)th frames in addition to an audio feature 804 of a t-th frame, in order to obtain a frame unit representation, which will be described later, with respect to the audio feature 804 of the t-th frame.

Referring to FIG. 8, paths in which the audio feature 804 of the t-th frame input to an input layer of the shared layer 720 is input to a node of Hidden Layer 1 together with the audio feature of the (t−2)th frame, the audio feature of the (t−1)th frame, the audio feature of the (t+1)th frame, and the audio feature of the (t+2)th frame are shown in bold dashed lines. Paths shown for the audio features of five frames as described above represent that the audio features of the frames are concatenated and input to a node of an upper layer.

All paths from the input layer to Hidden Layer 1 represent that the audio features of the (t−13)th to (t+9)th frames are concatenated in units of five frames and input to a node of Hidden Layer 1, similar to the audio features of the (t−2)th to (t+2)th frames. The concatenated audio features that pass through a hidden layer may be, for example, converted by the activation functions of the nodes of the hidden layer.

For example, the audio features of the (t−13)th to (t+9)th frames may be concatenated and converted while passing through Hidden Layers 1 through 3, and may be output as a frame unit representation 812 corresponding to the t-th frame through an output layer. The outputting of the frame unit representation corresponding to the audio feature 804 of the t-th frame of the TDNN may be sequentially and equally applied to the audio feature of the (t+1)th frame. In other words, the TDNN may sequentially output frame unit representations 810 respectively corresponding to the frames of the audio signal.

Because the TDNN may output the frame unit representation corresponding to an audio feature of a certain frame by using both the audio feature of a previous frame and the audio feature of a frame after a particular time period in addition to the audio feature of the certain frame as described above, the context of the audio signal may be maintained during training. Referring back to FIG. 7, as described above, the frame unit representations output by the shared layer 720 used to train the wake-up recognition model 710 may be input to the speaker identification layer 740 for identifying the speaker feature of the audio signal when the frame unit representations are input, the acoustic feature identification layer 760 for identifying the acoustic feature of the audio signal when the frame unit representations are input, and the keyword identification layer 780 for identifying the keyword feature included in the audio signal when the frame unit representations are input.

Figure 9:
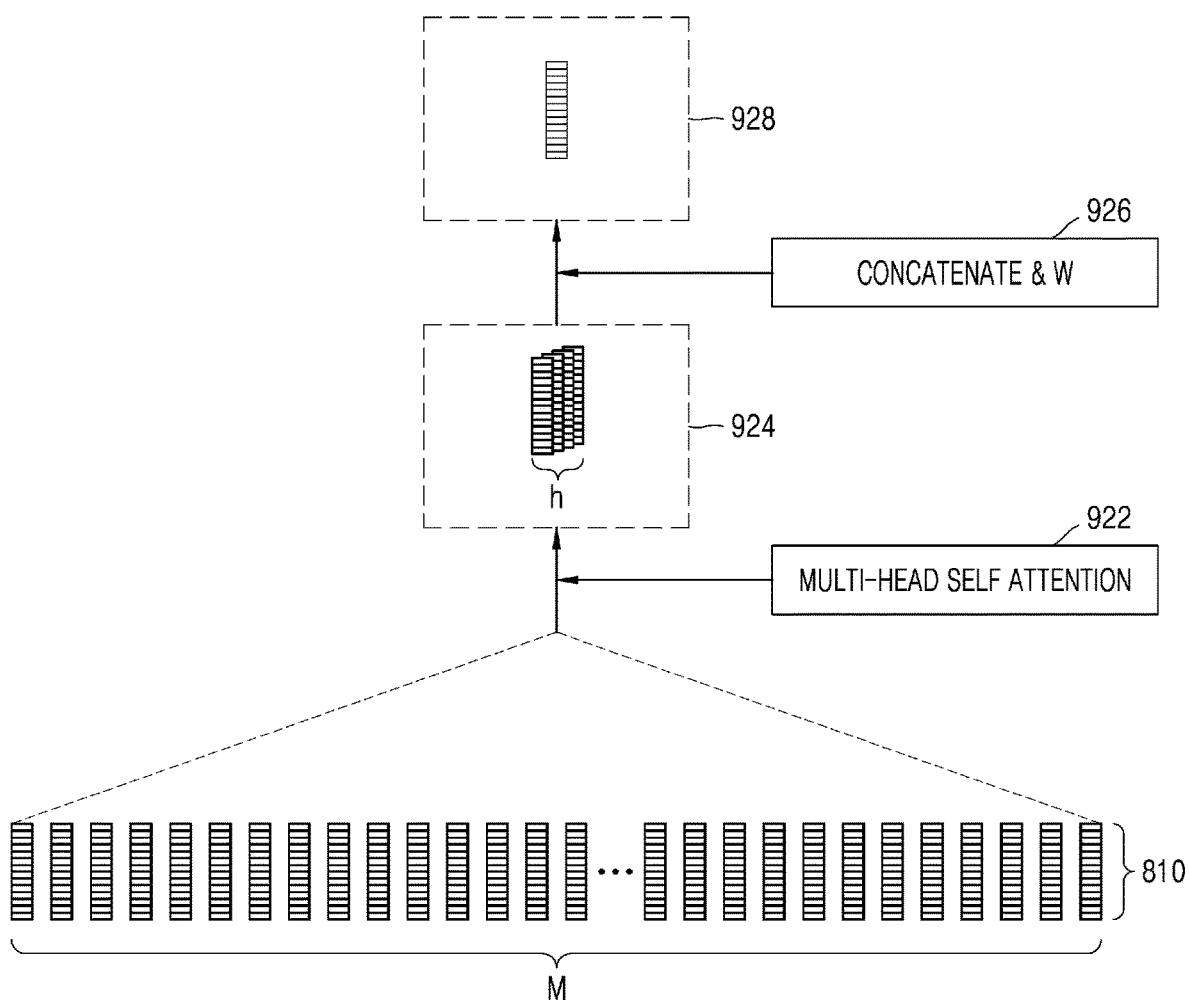
FIG. 9 is a diagram for describing a method of processing a frame unit representation output by a shared layer within a wake-up recognition model, according to an embodiment.

FIG. 9 is a diagram for describing a method of processing a frame unit representation output by a shared layer within a wake-up recognition model, according to an embodiment.

According to an embodiment, training data for identifying a call keyword from an audio signal including a user voice may be input to the shared layer 720. The keyword identification layer 780 may include, for example, a self-attention layer for setting attention for the frame unit representations output by the shared layer 720. A particular keyword may correspond to a segment unit representation generated based on weighted-summed frame unit representations. Training data for training a keyword identification layer may include information about a particular keyword and a plurality of segment unit representations corresponding to the particular keyword.

The self-attention layer included in the keyword identification layer 780 may set attention to the frame unit representations output by the shared layer 720, and weighted-sum the frame unit representations according to the set attention to thereby generate a segment unit representation. A plurality of frame unit representations output by a shared layer may be used in order to determine whether the audio features obtained from a plurality of consecutive frames correspond to a particular keyword.

Referring to FIG. 9, in response to the audio features for M frames of an audio signal, the shared layer 720 may output M frame unit representation 810. The M frame unit representations 810 output by the shared layer 720 may be input to the self-attention layer 722 included in the keyword identification layer 780. The self-attention layer 722 may use, for example, a multi-head self-attention mechanism 922 that concatenates pieces of information existing in different frame unit representations in order to emphasize a point for distinguishing the features of audio signals from each other.

The self-attention layer 722 may obtain h segment unit representations 924, the number h of which corresponds to the number of heads of the multi-head self-attention mechanism 922, from the M frame unit representations 810 by using the multi-head self-attention mechanism 922. The self-attention layer 722 may obtain, for example, a single segment unit representation 928 via a process 926 including concatenation of the h segment unit representations 924 and application of an attention matrix for adjusting the size of an audio feature.

Referring back to FIG. 7, the segment unit representation on a segment level that is output via the self-attention layer 722 may be input to the soft max layer that outputs a probability for a word label corresponding to a particular keyword. The segment unit representation within the soft max layer of the keyword identification layer 780 may be converted to a probability for each of a keyword node corresponding to a keyword of 'Hi Bixby' or 'Hello' and a filler node corresponding to a non-keyword. As such, the keyword identification layer 780 according to an embodiment may be trained using a method of adjusting a plurality of layers included in the shared layer 720 and the keyword identification layer 780 and attention related to a connection strength between the layers, based on the training data for keyword identification. The above-described process of training the keyword identification layer 780 is applicable to a process of training the speaker identification layer 740.

According to an embodiment, as shown in FIG. 7, training data for speaker identification and for learning the acoustic feature of a speaker who utters an audio signal in addition to the training data for keyword identification may be input to the shared layer. For example, the training data for speaker identification may include voice data uttered by about 20000 different speakers. The training data for learning the acoustic feature of the audio signal may include a particular phoneme string and information about an audio feature corresponding to the particular phoneme string.

A phoneme string used in training of the acoustic feature identification layer 760 for identifying an acoustic feature of a speaker is a string of phonemes, and thus may be a triphone including three phonemes. As described above, the frame unit representation output by the shared layer 720 may be input to a plurality of feed forward layers in which an activation function ReLU has been activated, and the frame unit representation in the plurality of feed forward layers may be converted into a probability value that is to correspond to a certain phonetic label.

According to an embodiment, when training of the wake-up recognition model 710 is completed, the electronic device 1000 may provide a voice recognition service by using a wake-up recognition module including a wake-up recognition model obtained by removing the acoustic feature identification layer 760 from the wake-up recognition model 710. When training of the wake-up recognition model 710 is completed, the electronic device 1000 may remove the acoustic feature identification layer 760 from the wake-up recognition model 710 and then may further remove the soft max layers included in the speaker identification layer 740 and the keyword identification layer 780 from the wake-up recognition model 710. In other words, because the electronic device 1000 uses a wake-up recognition model obtained by removing respective soft max layers 742 (for example, the output layers) of the speaker identification layer 740 and the keyword identification layer 780 from a wake-up recognition model obtained by removing the acoustic feature identification layer 760 from the wake-up recognition model 710, the electronic device 1000 may reduce the number of calculations for call keyword identification and speaker verification and also may improve the accuracy of call keyword identification and speaker verification.

Figure 10:
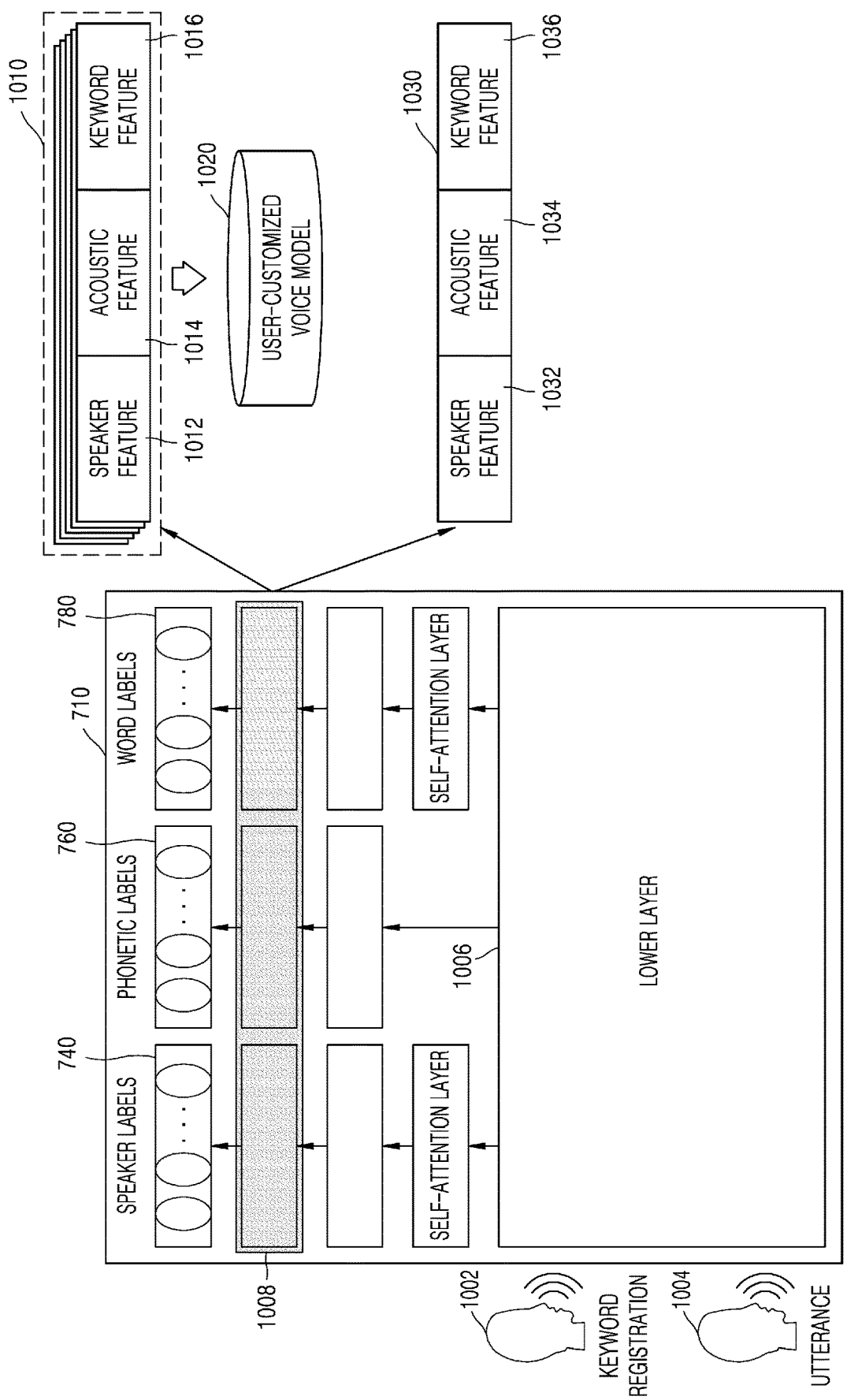
FIG. 10 is a diagram for explaining a method, performed by an electronic device, of providing a voice recognition service, based on a user call keyword, according to an embodiment.

FIG. 10 is a diagram for explaining a method, performed by an electronic device, of providing a voice recognition service, based on a user call keyword, according to an embodiment.

The electronic device 1000 may previously train a wake-up recognition model 710 within the wake-up recognition module to provide a voice recognition service. The wake-up recognition model 710, which is previously trained by the electronic device 1000, may include a lower layer 1006, a speaker identification layer 740, an acoustic feature identification layer 760, and a keyword identification layer 780. The lower layer 1006 may include layers on a frame level within the shared layer 720, the speaker identification layer 740, the acoustic feature identification layer 760, and the keyword identification layer 780. A structure of the wake-up recognition model 710 and a training method of the wake-up recognition model 710 are the same as those described above with reference to FIGS. 7 through 9, and thus detailed descriptions thereof will be omitted.

The electronic device 1000 may provide user customized call keyword registration and the WOV technique by using the wake-up recognition module including the pre-trained wake-up recognition model 710. For example, a process, performed by the electronic device 1000, of performing keyword registration 1002, based on a call keyword received from a user will be first described.

The electronic device 1000 may obtain a call keyword for activating a voice recognition service, based on a first user voice input. According to an embodiment, the electronic device 1000 may obtain a call keyword in an audio signal format through the microphone of the electronic device 1000, but may obtain a call keyword in a text format through the user input interface of the electronic device 1000.

When the electronic device 1000 obtains a call keyword in a text format from the user, the electronic device 1000, as described above with reference to FIGS. 3 and 4, may generate the user-customized voice DB 410 by inputting, to the TTS module 404, the call keyword obtained based on the first user voice input and the user call keyword voice DB 408 stored in the memory of the electronic device 1000 before the call keyword is obtained. The electronic device 1000 may generate a user-customized voice model 1020 by using user-customized features that are output by inputting the audio signals within the user-customized voice DB 410 to a wake-up recognition module. According to an embodiment, user-customized voice models 1020 may include a plurality of user-customized features output in vector formats from the wake-up recognition module including the wake-up recognition model 710.

According to an embodiment, when training of the wake-up recognition model 710 is completed, the electronic device 1000 may perform the keyword registration 1002 by using a wake-up recognition module including a wake-up recognition model obtained by removing soft max layers respectively included in the speaker identification layer 740, the acoustic feature identification layer 760, and the keyword identification layer 780 from the wake-up recognition model 710. According to an embodiment, the electronic device 1000 may generate user-customized features by using segment unit representations that are output by a layer 1008 right before the respective soft max layers of the speaker identification layer 740, the acoustic feature identification layer 760, and the keyword identification layer 780. In other words, the user-customized features generated by the electronic device 1000 inputting the audio signals within the user-customized voice DB 410 generated using the wake-up recognition module may include a segment unit representation output by the speaker identification layer 740, a segment unit representation output by the acoustic feature identification layer 760, and a segment unit representation output by the keyword identification layer 780.

The segment unit representation output by the speaker identification layer 740, the segment unit representation output by the acoustic feature identification layer 760, and the segment unit representation output by the keyword identification layer 780 may include a speaker feature 1012 for identifying a speaker, an acoustic feature 1014 of a speaker who utters the audio signals, and a keyword feature 1016 for identifying a keyword, respectively. Accordingly, a user-customized feature 1010 obtained by the electronic device 1000 may include the speaker feature 1012 for identifying a speaker, the acoustic feature 1014 of a speaker who utters the audio signals, and the keyword feature 1016 for identifying a keyword.

According to an embodiment, the electronic device 1000 may set attention to the speaker feature 1012, the acoustic feature 1014, and the keyword feature 1016, based on the segment unit representations obtained by the layer 1008 of the wake-up recognition model 710, and may concatenate at least one of the speaker feature, the acoustic feature, or the keyword feature according to the set attention, thereby obtaining a user-customized feature in which the speaker feature, the acoustic feature and the keyword feature are concatenated in a vector format. However, embodiments of the disclosure are not limited thereto, and the electronic device 1000 may obtain a user-customized feature in a matrix format by concatenating the speaker feature, the acoustic feature, and the keyword feature. The user-customized feature obtained by the electronic device 1000 may include an arbitrary format for identifying a call keyword, based on the speaker feature, the acoustic feature and the keyword feature.

When the electronic device 1000 obtains a call keyword in an audio format from a user instead of obtaining a call keyword in a text format from the user, the electronic device 1000 may obtain user-customized features by immediately inputting an obtained audio signal to the pre-trained wake-up recognition module.

The electronic device 1000 may generate the user-customized voice model 1020 by using the obtained user-customized features and may store the generated user-customized voice model 1020 in the memory of the electronic device 1000, thereby completing registration of a user customized call keyword. A process, performed by the electronic device 1000, of activating a voice recognition service, based on a newly-received utterance 1004 of the user after completing the keyword registration 1002 will now be described.

The electronic device 1000 may store the user-customized voice model 1020 generated based on the user-customized keyword, and then may obtain a new audio signal, which is a user voice who utters a registration keyword, based on a second user voice input. According to an embodiment, the electronic device 1000 may divide an audio signal obtained based on the second user voice input in units of frames, thereby obtaining audio signals corresponding to a plurality of frames. The electronic device 1000 may obtain an output value of a wake-up recognition module including the wake-up recognition model 710 from the wake-up recognition module, by inputting the newly obtained audio signal to the wake-up recognition module.

According to an embodiment, the electronic device 1000 may obtain an output value of a wake-up recognition module by inputting an audio signal newly obtained from the user to the wake-up recognition module, similar to the process of obtaining the user-customized feature 1010 by inputting the audio signal of the user-customized voice DB to the wake-up recognition module.

According to an embodiment, the electronic device 1000 may obtain the speaker feature, the acoustic feature and the keyword feature on respective segment levels of the speaker identification layer, the acoustic feature identification layer and the keyword identification layer, may set attention to the speaker feature, the acoustic feature and the keyword feature, and may concatenate at least one of the speaker feature, the acoustic feature, or the keyword feature according to the set attention to thereby obtain an output value 1030 of the wake-up recognition module represented in a vector format.

Accordingly, the output value 1030 of the wake-up recognition module output by inputting the audio signal newly obtained based on the second user voice input to the wake-up recognition module may include a speaker feature 1032 output by the speaker identification layer within the wake-up recognition model, an acoustic feature 1034 output by the acoustic feature identification layer within the wake-up recognition model, or a keyword feature 1036 output by the keyword identification layer within the wake-up recognition model.

The speaker feature 1032 within the output value of the wake-up recognition module may be defined as a segment unit representation of the speaker identification layer based on a frame unit representation output by a shared layer in response to the newly obtained audio signal, the acoustic feature 1034 may be defined as a segment unit representation output by the acoustic feature identification layer based on the frame unit representation, and the keyword feature 1036 may be defined as a segment unit representation output by the keyword identification layer.

The electronic device 1000 may determine a similarity score representing similarity between the user-customized feature 1010 output in a vector format and the output value 1030 in a vector format of the wake-up recognition module for the new audio signal, by comparing the user-customized feature 1010 with the output value 1030 of the wake-up recognition module, and may activate a voice recognition service, based on whether the determined similarity score is greater than or equal to a first threshold value. According to an embodiment, when the similarity score representing similarity between the user-customized feature and the output value of the wake-up recognition module is greater than or equal to the first threshold value, the electronic device 1000 may activate the voice recognition service.

According to an embodiment, the electronic device 1000 may determine a first portion similarity score related to similarity between the speaker feature 1032 within the output value 1030 of the wake-up recognition module for the audio signal obtained based on the second user voice input and the speaker feature 1012 of the user-customized feature 1010, determine a second portion similarity score related to similarity between the acoustic feature 1034 within the output value 1030 of the wake-up recognition module and the acoustic feature 1014 of the user-customized feature 1010, and determine a third portion similarity score related to similarity between the keyword feature 1036 within the output value 1030 of the wake-up recognition module and the keyword feature 1016 of the user-customized feature 1010.

The electronic device 1000 may determine whether to activate a voice recognition service, based on the determined first portion similarity score, the determined second portion similarity score and the determined third portion similarity score. According to an embodiment, when the first portion similarity score is greater than or equal to a second threshold value, the second portion similarity score is greater than or equal to a third threshold value, and the third portion similarity score is greater than or equal to a fourth threshold value, the electronic device 1000 may activate the voice recognition service. A criterion for the electronic device 1000 to activate the voice recognition service based on the first portion similarity score, the second portion similarity score and the third portion similarity score is not limited to thereto, and the criterion may vary according to the characteristics of an obtained audio signal or the accuracy of desired voice recognition.

Figure 11:
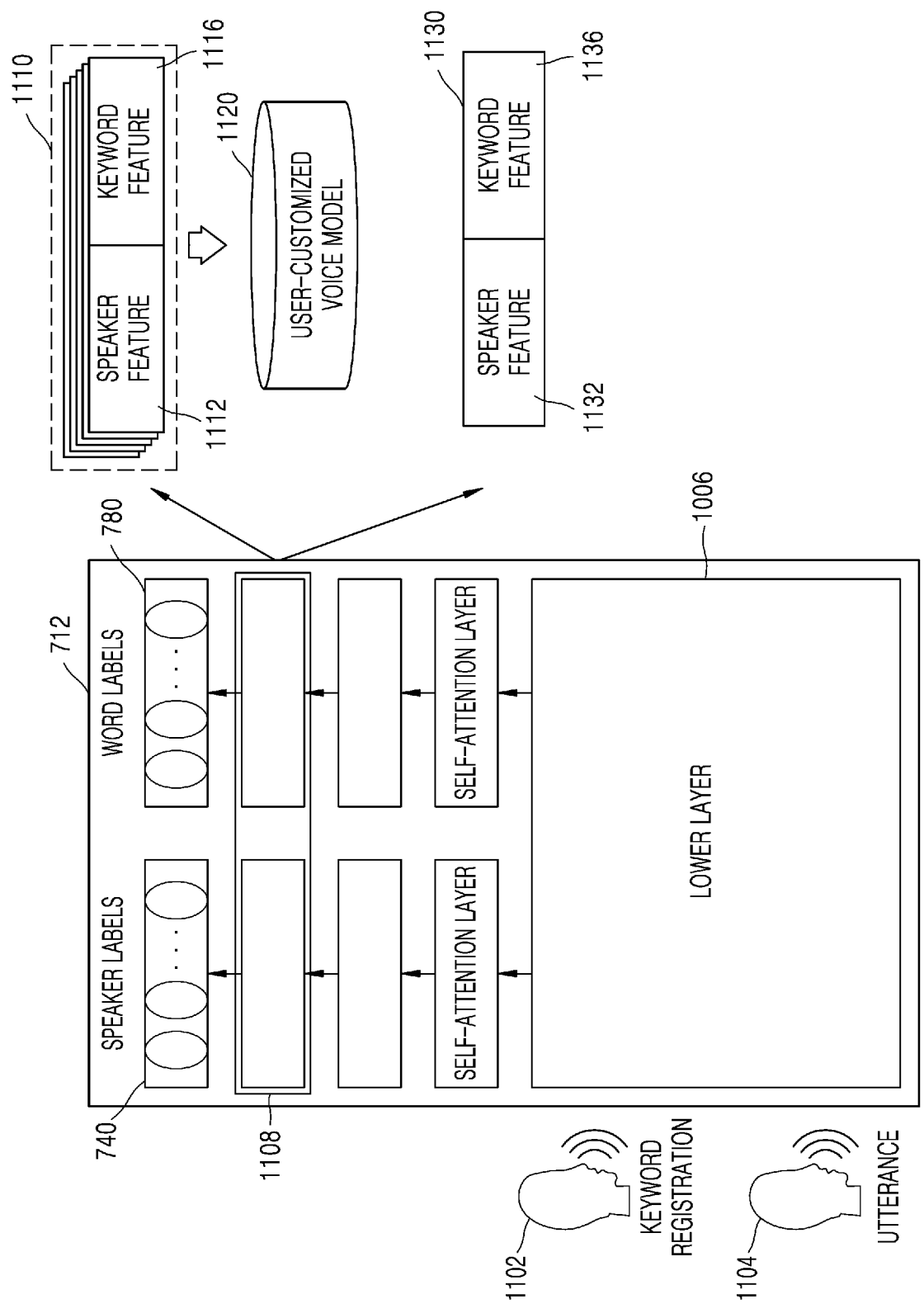
FIG. 11 is a diagram for explaining a method, performed by an electronic device, of providing a voice recognition service, based on a user call keyword, according to an embodiment.

FIG. 11 is a diagram for explaining a method, performed by an electronic device, of providing a voice recognition service, based on a user call keyword, according to an embodiment.

According to an embodiment, the electronic device 1000 may provide the voice recognition service by using a wake-up recognition module including a wake-up recognition model 712 that is different from the wake-up recognition model 710 of FIG. 10. For example, the electronic device 1000 may provide a voice recognition service by using a wake-up recognition module including the wake-up recognition model 712 obtained by removing the acoustic feature identification layer 760, the soft max layer of the speaker identification layer 740, and the soft max layer of the keyword identification layer 780 from the wake-up recognition model 710 of FIG. 10. In other words, the electronic device 1000 may provide keyword registration 1102 and the WOV technique, by using the wake-up recognition module including the wake-up recognition model 712 obtained by removing the acoustic feature identification layer 760, the soft max layer of the speaker identification layer 740, and the soft max layer of the keyword identification layer 780 from the pre-trained wake-up recognition model 710.

A process, performed by the electronic device 1000, of performing the keyword registration 1102, based on a call keyword received from a user will be first described. For example, the electronic device 1000 may obtain a call keyword for activating a voice recognition service, based on a first user voice input. However, according to an embodiment, the electronic device 1000 may obtain a call keyword in a text format through the user input interface of the electronic device 1000.

When the electronic device 1000 obtains a call keyword in a text format from a user, the electronic device 1000 may generate the user-customized voice DB 410 by inputting the call keyword and the pre-stored user call keyword voice DB 408 to the TTS module 404, as described above with reference to FIGS. 3 and 4. The electronic device 1000 may generate a user-customized voice model 1120 by using one or more of user-customized features 1110 that is output by inputting the audio signals within the user-customized voice DB 410 to a wake-up recognition module.

Because the wake-up recognition module uses the wake-up recognition model 712 obtained by removing, from the wake-up recognition model 710 of FIG. 10 for which training has been completed, the acoustic feature identification layer 760, the soft max layer of the speaker identification layer 740, and the soft max layer of the keyword identification layer 780, the user-customized feature 1110 obtained by the electronic device 1000 inputting the audio signals within the user-customized voice DB 410 to the wake-up recognition module including the wake-up recognition model 712 may include a segment unit representation output by the speaker identification layer 740 and a segment unit representation output by the keyword identification layer 780.

The segment unit representation output by the speaker identification layer 740 and the segment unit representation output by the keyword identification layer 780 may include a speaker feature 1112 for identifying a speaker and a keyword feature 1116, respectively. Accordingly, the user-customized feature 1110 obtained by the electronic device 1000 from the wake-up recognition module including the wake-up recognition model 712 may include the speaker feature 1112 and the keyword feature 1116. According to an embodiment, the user-customized features obtained by the electronic device 1000 from the wake-up recognition module including the wake-up recognition model 712 may be represented in vector formats, and, when the user-customized features are represented in vector formats, the speaker feature 1112 and the keyword feature 1116 may also be represented in vector formats.

According to an embodiment, the electronic device 1000 may set attention to the speaker feature 1112 and the keyword feature 1116, based on the segment unit representations obtained by a layer 1108 of the wake-up recognition model 712, and may concatenate the speaker feature 1112 and the keyword feature 1116 according to the set attention, thereby obtaining the user-customized feature 1110.

According to an embodiment, the electronic device 1000 may obtain a plurality of user-customized features by inputting the audio signals within the user-customized voice DB 410 to the wake-up recognition module including the wake-up recognition model 712 a plurality of numbers of times. The electronic device 1000 may determine an average value of the speaker features 1112 and an average value of the keyword feature 1116 within the user-customized features output by the wake-up recognition module including the wake-up recognition model 712, and may generate the user-customized feature 1110 including the average value of the speaker features 1112 and the average value of the keyword feature 1116 as elements.

According to an embodiment, the electronic device 1000 may set attention to the average value of the speaker features 1112 and the average value of the keyword feature 1116, and weighted-sum the average value of the speaker features 1112 and the average value of the keyword feature 1116 to thereby generate the user-customized feature 1110. When the electronic device 1000 obtains a call keyword in an audio format from a user instead of obtaining a call keyword in a text format from the user, the electronic device 1000 may obtain user-customized features 1110 by immediately inputting the obtained audio signal to a wake-up recognition module including the pre-trained wake-up recognition model 712.

The electronic device 1000 may generate the user-customized voice model 1120 by using the obtained user-customized features 1110, and may store the generated user-customized voice model 1020 in the memory of the electronic device 1000, thereby completing a process of registering a user customized call keyword. A process, performed by the electronic device 1000, of activating a voice recognition service, based on a newly-received utterance 1104 of the user after completing the keyword registration 1102 will now be described.

The electronic device 1000 may store the user-customized voice model 1120 generated based on a keyword customized by the user, and then may obtain a new audio signal split in units of frames, based on a second user voice input. The electronic device 1000 may input the newly obtained audio signal to the wake-up recognition module including the wake-up recognition model 712 to obtain an output value of the wake-up recognition module for the new audio signal.

For example, the electronic device 1000 may obtain an output value 1130 of the wake-up recognition module for an audio signal, by inputting the audio signal newly obtained from the user to the wake-up recognition module, similar to the process of obtaining the user-customized feature 1110 by inputting an audio signal of the user-customized voice DB to the wake-up recognition module. For example, the electronic device 1000 may obtain the speaker feature and the keyword feature on respective segment levels of the speaker identification layer and the keyword identification layer, may set attention to the speaker feature and the keyword feature, and may concatenate the speaker feature and the keyword feature according to the set attention to thereby obtain the output value 1130 of the wake-up recognition module for the audio signal newly obtained based on the second user voice input. Accordingly, the output value 1130 of the wake-up recognition module obtained by the electronic device 1000 may include a speaker feature 1132 for identifying a speaker and a keyword feature 1136 for identifying a keyword.

The electronic device 1000 may determine a similarity score representing a similarity between the user-customized feature 1110 and the output value 1130 of the wake-up recognition module for the newly obtained audio signal, by comparing the user-customized feature 1110 with the output value 1130 of the wake-up recognition module, and may activate a voice recognition service, based on whether the determined similarity score is greater than or equal to a first threshold value. According to an embodiment, when the similarity score representing similarity between the user-customized feature 1110 and the output value 1130 of the wake-up recognition module is greater than or equal to the first threshold value, the electronic device 1000 may activate the voice recognition service.

According to an embodiment, the electronic device 1000 may determine a first portion similarity score related to similarity between the speaker feature 1132 within the output value 1130 of the wake-up recognition module for the new audio signal and the speaker feature 1112 of the user-customized feature 1110, and may determine a second portion similarity score related to similarity between the keyword feature 1136 within the output value 1130 of the wake-up recognition module and the keyword feature 1116 of the user-customized feature 1110.

The electronic device 1000 may determine whether to activate a voice recognition service, based on the determined first portion similarity score and the determined second portion similarity score. According to an embodiment, when the first portion similarity score is greater than or equal to a second threshold value and the second portion similarity score is greater than or equal to a third threshold value, the electronic device 1000 may activate the voice recognition service.

Figure 12:
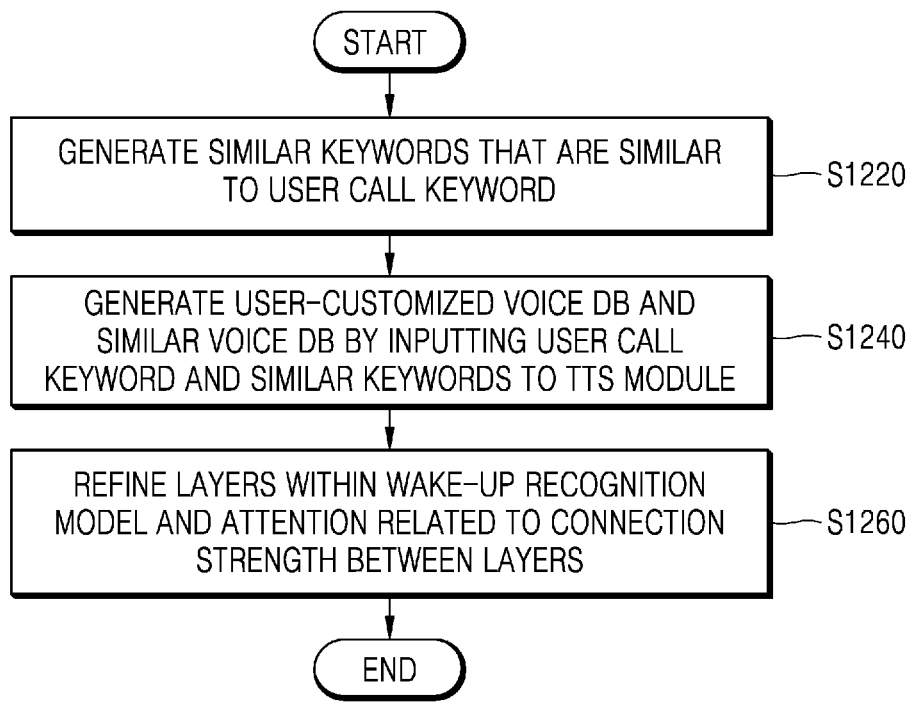
FIG. 12 is a flowchart of a method, performed by an electronic device, of providing a voice recognition service by using similar keywords similar to a user call keyword, according to an embodiment.

FIG. 12 is a flowchart of a method, performed by an electronic device, of providing a voice recognition service by using similar keywords similar to a user call keyword, according to an embodiment.

In operation S1220, the electronic device 1000 may generate similar keywords that are similar to a user call keyword. For example, the electronic device 1000 may generate similar keywords that are similar to a user call keyword obtained from a user of the electronic device 1000, by using a pre-stored language model or a personalized language model pre-stored based on a usage history of the user. A method, performed by the electronic device 1000, of generating the similar keywords will be described in detail later with reference to FIG. 13.

In operation S1240, the electronic device 1000 may generate a similar voice DB including audio signals corresponding to the similar keywords by inputting the similar keywords to a TTS module. The electronic device 1000 may generate a user-customized voice DB by inputting the user call keyword to the TTS module.

In operation S1260, the electronic device 1000 may re-train a wake-up recognition model within a wake-up recognition module, based on the audio signals within the user-customized voice DB and the similar voice DB. For example, the electronic device 1000 may refine layers within the wake-up recognition model and attention related to a connection strength between the layers, by using, as training data, the audio signals within the user-customized voice DB and the similar voice DB. A method, performed by the electronic device 1000, of re-training the wake-up recognition model within the wake-up recognition module, based on the audio signals within the user-customized voice DB and the similar voice DB will now be described in detail with reference to FIG. 13.

Figure 13:
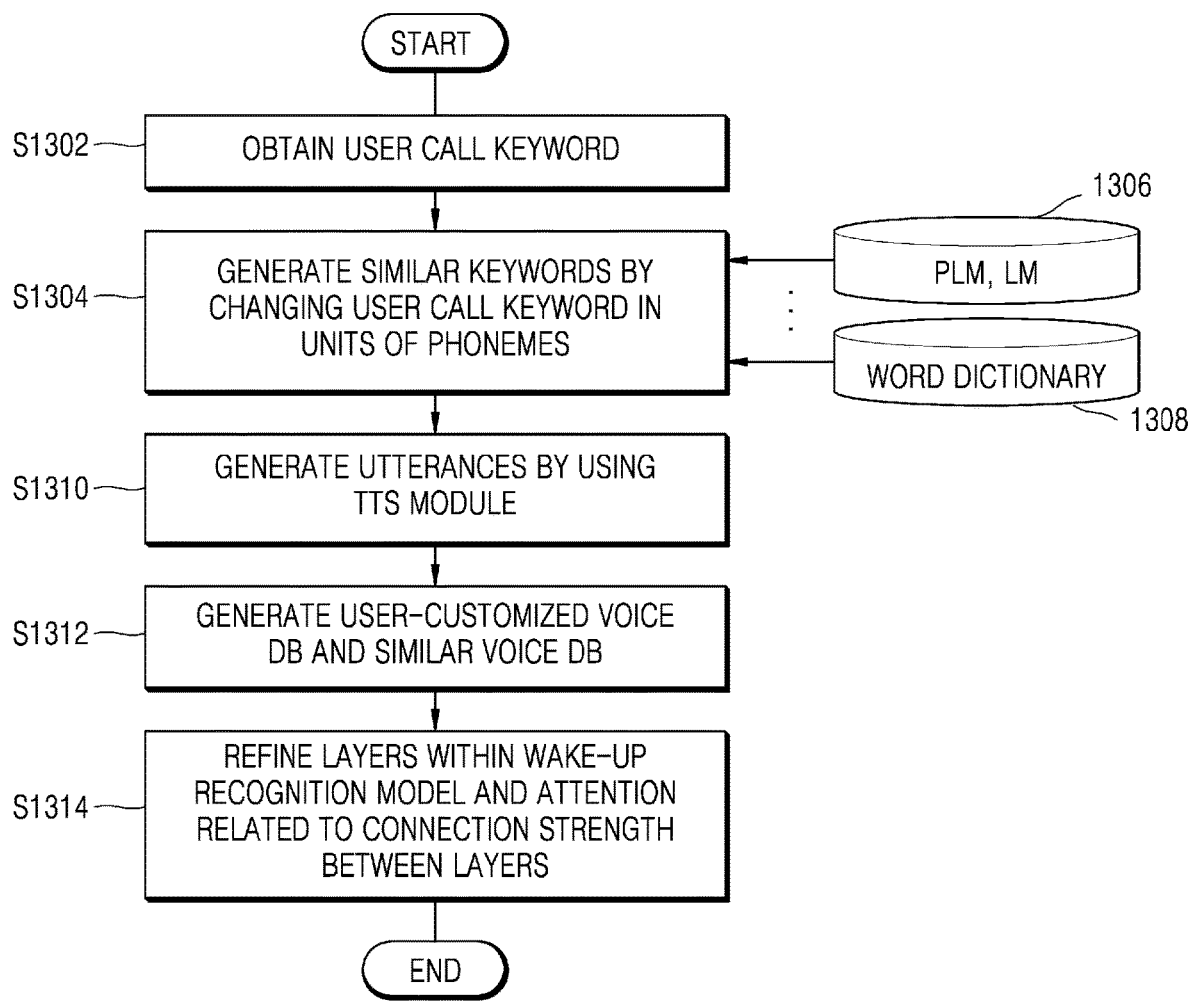
FIG. 13 is a flowchart of a method, performed by an electronic device, of providing a voice recognition service by using similar keywords that are similar to a user call keyword, according to an embodiment.

FIG. 13 is a flowchart of a method, performed by an electronic device, of providing a voice recognition service by using similar keywords that are similar to a user call keyword, according to an embodiment.

According to an embodiment, the electronic device 1000 may obtain a user call keyword from a user (operation S1302). The electronic device 1000 may generate similar keywords that are similar to the user call keyword (operation S1304). For example, the electronic device 1000 may generate similar keywords that are similar to a user call keyword obtained from a user of the electronic device 1000, by using a language model 1306 including a pre-stored language model (LM) and a personalized language model (PLM) pre-stored based on a usage history of the user or a pre-stored word dictionary 1308.

According to an embodiment, the electronic device 1000 may generate the similar keywords by changing the user call keyword in units of phonemes, based on the LM or the PLM. However, according to an embodiment, the electronic device 1000 may generate the similar keywords by changing the user call keyword in units of syllables. For example, when the electronic device 1000 obtains a user call keyword such as 'Hong Gil Dong' from the user, the electronic device 1000 divides the obtained user call keyword into syllables. In other words, when the electronic device 1000 obtains the user call keyword such as 'Hong Gil Dong', based on a user voice input, the electronic device 1000 may divide the user call keyword into a first syllable 'Hong', a second syllable 'Gil' and a third syllable 'Dong' and recognize the first syllable 'Hong', the second syllable 'Gil', and the third syllable 'Dong'.

The electronic device 1000 may generate similar keywords similar to the obtained user call keyword, such as 'Kang Gil Dong', 'Ro Gil Dong', 'Hong Ga Dong', and 'Hong Na Dong', by changing the first syllable, the second syllable, and the third syllable within the user call keyword to characters representing different syllables from the first syllable, the second syllable, and the third syllable.

In more detail, the electronic device 1000 may change characters within the user call keyword, based on similarity between the syllables within the user call keyword. The similarity between the syllables may be determined based on an arrangement sequence of consonants or vowels of one syllable within the user call keyword and similarity between utterances of consonants or vowels in the arrangement sequence.

When the electronic device 1000 changes a user call keyword in units of phonemes, the electronic device 1000 may change characters within the user call keyword, based on similarity between phonemes within the user call keyword. The similarity between phonemes may be determined based on a distinctive feature as a criterion for analyzing a phonological structure in linguistics. For example, the electronic device 1000 may classify a vowel 'ng' of 'Dong' within the call keyword 'Hong Gil Dong' into a voiced sound (ringing sound), and may generate similar keywords such as 'Hong Gil Dome' by changing 'Dong' to 'Dome' by using 'me' also representing a voiced sound (ringing sound). According to an embodiment, the electronic device 1000 may store, in the memory, information about an articulation method, an articulation position, or the like for distinguishing similarity between phonemes, and may identify similarity between phonemes within a user call keyword, based on the information about the articulation method, the articulation position, or the like.

According to an embodiment, the electronic device 1000 may generate audio signals by inputting similar keywords and user call keywords to a pre-trained TTS module (operation S1310). The electronic device 1000 may generate a user-customized voice DB including an audio signal related to the user call keyword and a similar voice DB including audio signals related to the similar keywords, based on the audio signals output by inputting the user call keywords and the similar keywords to the TTS module (operation S1312).

The electronic device 1000 may re-train a wake-up recognition model within a wake-up recognition module, based on the audio signals within the user-customized voice DB and the similar voice DB. In other words, the electronic device 1000 may refine layers within the wake-up recognition model and attention related to a connection strength between the layers, based on the audio signals within the user-customized voice DB and the similar voice DB (operation S1314).

According to an embodiment, the electronic device 1000 may list up, in the memory, a user-customized feature that is output when an audio signal related to 'Hong Gil Dong' within the user-customized voice DB is input to the wake-up recognition model 710, and may list up, in the memory, similar user-customized features that are output when audio signals related to 'Kang Gil Dong', 'Ro Gil Dong', and 'Hong Ga Dong' within the similar voice DB are input to the wake-up recognition model 710. The electronic device 1000 may obtain anew audio signal related to a registered call keyword and may compare an output value of the wake-up recognition module output by inputting the obtained audio signal to the wake-up recognition module with the user-customized feature and the similar user-customized features.

For example, the electronic device 1000 may determine a first similarity by comparing the output value of the wake-up recognition module for the audio signal related to the registered call keyword with the user-customized feature listed up in the memory, and may determine a second similarity by comparing the output value of the wake-up recognition module with the similar user-customized features listed up in the memory. The electronic device 1000 may identify a new audio signal that uttered a registered keyword as a correct answer, when the first similarity is greater than the second similarity, but may identify the new audio signal that uttered the registered keyword as an incorrect answer, when the first similarity is less than the second similarity.

However, as described above, the electronic device 1000 may re-train the wake-up recognition model so that the wake-up recognition model identifies only 'Hong Gil Dong' as a correct answer, by modifying and refining the layers of the wake-up recognition model within the wake-up recognition module and the attention about the connection strength between the layers, without needing to list up the user-customized feature and the similar user-customized features in the memory. In other words, the electronic device 1000 may more accurately recognize a user voice by using the wake-up recognition module including the wake-up recognition model 710 re-trained based on not only the user-customized feature related to 'Hong Gil Dong' but also the similar user-customized features corresponding to 'Kang Gil Dong', 'Ro Gil Dong', and 'Hong Ga Dong' or by identifying the user voice based on whether the output value of the wake-up recognition module for a newly obtained audio signal is close to the output value of the wake-up recognition module for the audio signal that may be recognized as a correct answer or to the user-customized features that may be recognized as an incorrect answer.

According to an embodiment, the electronic device 1000 may re-train the wake-up recognition model by using a server, without directly re-training the wake-up recognition model 710 within the wake-up recognition module. For example, the electronic device 1000 may transmit, to a server 2000, a user-customized feature that is output when the audio signal related to 'Hong Gil Dong' is input to the wake-up recognition model 710, and the similar user-customized features that are output when the audio signals related to 'Kang Gil Dong', 'Ro Gil Dong', and 'Hong Ga Dong' are input to the wake-up recognition model 710. The server 2000 may include one or more wake-up recognition models for providing a voice recognition service. The server 2000 may modify and refine layers within the wake-up recognition model within a wake-up recognition module and attention related to a connection strength between the layers, based on the user-customized feature and the similar user-customized features received from the electronic device 1000. The electronic device 1000 may receive the layers within the wake-up recognition model and attention related to connection strengths between the layers from the server 2000, and may re-train the wake-up recognition model 710 by changing the attention within the wake-up recognition model 710 of the wake-up recognition module currently stored in the electronic device 1000.

Figure 14:
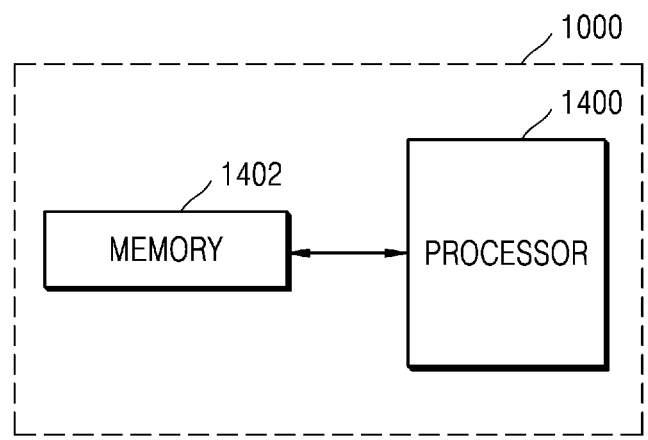
FIG. 14 is a block diagram of an electronic device according to an embodiment.
Figure 15:
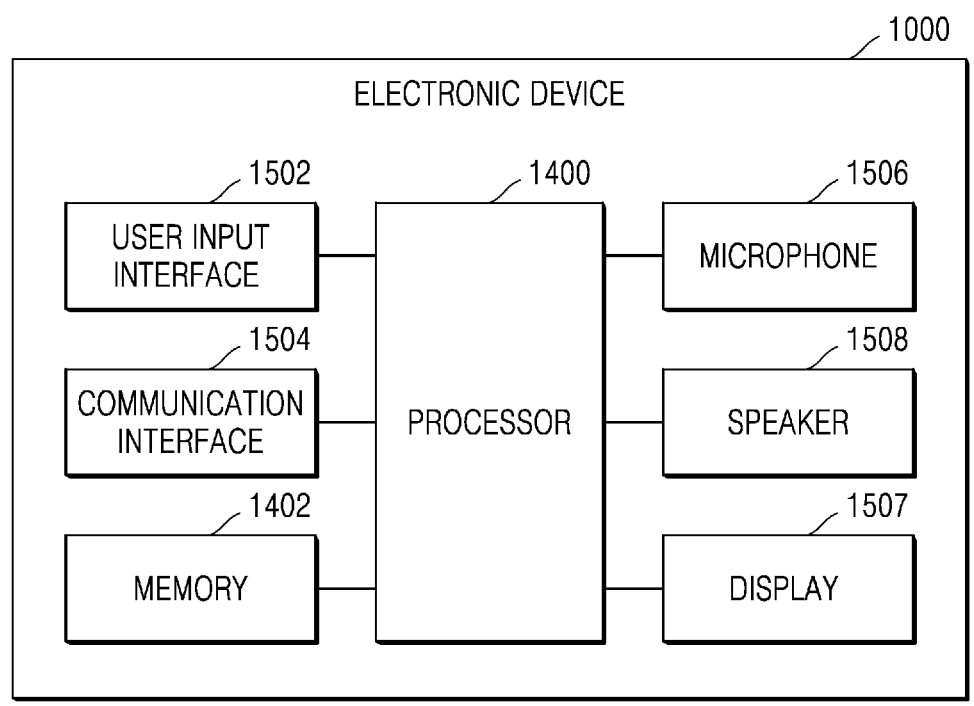
FIG. 15 is a block diagram of an electronic device according to an embodiment.

FIG. 14 is a block diagram of an electronic device 1000 according to an embodiment. FIG. 15 is a block diagram of an electronic device 1000 according to an embodiment.

Referring to FIG. 14, the electronic device 1000 according to an embodiment may include a processor 1400 and a memory 1402. However, all of the illustrated components are not essential. The electronic device 1000 may be implemented by more or less components than those illustrated in FIG. 14. For example, referring to FIG. 15, the electronic device 1000 according to an embodiment may further include a user input interface 1502, a communication interface 1504, a microphone 1506, a display 1507, and a speaker 1508 in addition to the processor 1400 and the memory 1402.

The processor 1400 controls all operations of the electronic device 1000 by executing at least one instruction stored in the memory 1402. For example, the processor 1400 may control the user input interface 1502, the communication interface 1504, the microphone 1506, the display 1507, and the speaker 1508 by executing the at least one instruction stored in the memory 1402. The processor 1400 may perform a function of the electronic device 1000 of FIGS. 1 through 13, by executing the at least one instruction stored in the memory 1402.

The processor 1400 may include one or more processors. The one or more processors may be a general-use processor such as a CPU, an AP, or a digital signal processor (DSP), a graphic-dedicated processor such as a GPU or a vision processing unit (VPU), or an AI-dedicated processor such as an NPU. According to an embodiment, when the processor 1400 is implemented as a plurality of processors, the graphic-dedicated processor, or the AI-dedicated processor such as an NPU, at least some of the plurality of processors, the graphic-dedicated processor, or the AI-dedicated processor such as an NPU may be mounted on the electronic device 1000 and an electronic device connected to the electronic device 1000 or a plurality of servers.

For example, by executing one or more instructions, the processor 1400 may obtain a user call keyword for activating the voice recognition service, based on a first user voice input, and may input the obtained user call keyword to a pre-trained TTS module to generate a user-customized voice DB.

By executing one or more instructions, the processor 1400 may obtain a user-customized feature in a vector format by inputting an audio signal of the user-customized voice DB to a pre-trained wake-up recognition module.

By executing one or more instructions, the processor 1400 may obtain a voice DB related to call keywords pre-stored to active the voice recognition service, and may input the voice DB related to the call keywords and the user call keyword to the TTS module to thereby generate the user-customized voice DB.

By executing one or more instructions, the processor 1400 may obtain an audio signal, based on a second user voice input, obtain an output value of the wake-up recognition module by inputting the obtained audio signal to the wake-up recognition module, and may activate the voice recognition service, based on a result of a comparison between the obtained output value of the wake-up recognition module and the user-customized feature.

By executing one or more instructions, the processor 1400 may generate similar keywords similar to the user call keyword by using a pre-stored language model, may generate a similar voice DB by inputting the generated similar keywords to the TTS module, and may refine the layers within the wake-up recognition module and the attention related to a connection strength between the layers, based on the audio signals of the similar voice DB and the user-customized voice DB.

According to an embodiment, the processor 1400 may determine a window length of a window for splitting the obtained audio signal in units of frames, may overlap windows each having the determined window length at a certain window interval, and split the obtained audio signal into a plurality of frames by using the overlapped windows.

By executing one or more instructions, the processor 1400 may obtain the speaker feature, the acoustic feature and the keyword feature on respective segment levels of the speaker identification layer, the acoustic feature identification layer and the keyword identification layer of the wake-up recognition model within the wake-up recognition module, may set attention to the speaker feature, the acoustic feature and the keyword feature, and may concatenate at least one of the speaker feature, the acoustic feature, or the keyword feature according to the set attention to thereby obtain the output value of the wake-up recognition module for a newly obtained audio signal. According to an embodiment, the electronic device 1000 may obtain the output value of the wake-up recognition module in a vector format by concatenating at least one of the speaker feature, the acoustic feature, or the keyword feature.

The processor 1400 may determine a similarity score related to similarity between an output value of the wake-up recognition module for the audio signal obtained based on the second user voice input and the user-customized feature, and may activate the voice recognition service, based on whether the determined similarity score is greater than or equal to a preset first threshold value.

The processor 1400 determine respective portion similarity scores of the speaker feature, the acoustic feature, and the keyword feature within the output value of the wake-up recognition module for the audio signal obtained based on the second user voice input, and may activate the voice recognition service when the portion similarity score of the speaker feature is greater than or equal to a second threshold value, the portion similarity score of the acoustic feature is greater than or equal to a third threshold value, and the portion similarity score of the keyword feature is greater than or equal to a fourth threshold value.

The processor 1400 may generate a user-customized voice model, based on the user-customized feature, and store the generated user-customized voice model in the memory 1402.

The memory 1402 may include one or more instructions for controlling an operation of the electronic device 1000. The memory 1402 may include a wake-up recognition module or TTS module necessary for activating a voice recognition service. The memory 1402 may include an ASR module, an NLU module, a TTS module, and the like necessary for providing a voice recognition service. According to an embodiment, the programs stored in the memory 1402 may be classified into a user interface (UI) module, a touch screen module, and a notification module, and the like according to their functions.

According to an embodiment, the memory 1402 may include, but is not limited to, at least one type of storage medium selected from among a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable ROM (EEPROM), a programmable ROM (PROM), magnetic memory, a magnetic disk, and an optical disk.

The user input interface 1502 may receive a user input for controlling an operation of the electronic device 1000. For example, the user input interface 1502 may include, but is not limited to, a key pad, a dome switch, a touch pad (e.g., a capacitive overlay type, a resistive overlay type, an infrared beam type, an integral strain gauge type, a surface acoustic wave type, a piezo electric type, or the like), a jog wheel, or a jog switch.

The communication interface 1504 may include one or more communication modules for communication with the server 2000. For example, the communication interface 1504 may include at least one of a short-range wireless communication interface or a mobile communication interface.

Examples of the short-range wireless communication interface may include, but are not limited to, a Bluetooth communication interface, a Bluetooth Low Energy (BLE) communication interface, a near field communication (NFC) interface, a wireless local area network (WLAN) (e.g., Wi-Fi) communication interface, a ZigBee communication interface, an infrared Data Association (IrDA) communication interface, a Wi-Fi direct (WFD) communication interface, an ultra-wideband (UWB) communication interface, and an Ant+ communication interface.

The mobile communication interface may exchange a wireless signal with at least one selected from a base station, an external terminal, and a server on a mobile communication network. Here, examples of the wireless signal may include a voice call signal, a video call signal, and various types of data according to text/multimedia messages transmission.

The microphone 1506 may receive an audio signal including a voice of a user. The microphone 1506 may also receive an audio signal including a noise signal generated from a plurality of noise sources in addition to the voice of the user. The microphone 1506 may transmit the received audio signal to the processor 1400 such that a voice recognition service based on a wake-up recognition module may be performed.

The speaker 1508 may output a result of recognizing the voice of the user included in the audio signal, as an audio signal. For example, the speaker 1508 may output, as sound, a signal related to a function (for example, a call signal receiving sound, a message receiving sound, or a notification sound) of the electronic device 1000.

The display 1507 may display information that is processed by the electronic device 1000. For example, the display 1507 may display a result of recognizing the voice of the user included in the audio signal, in a text format. The display 1507 may display, for example, an interface for controlling the electronic device 1000 and an interface for displaying the status of the electronic device 1000.

Figure 16:
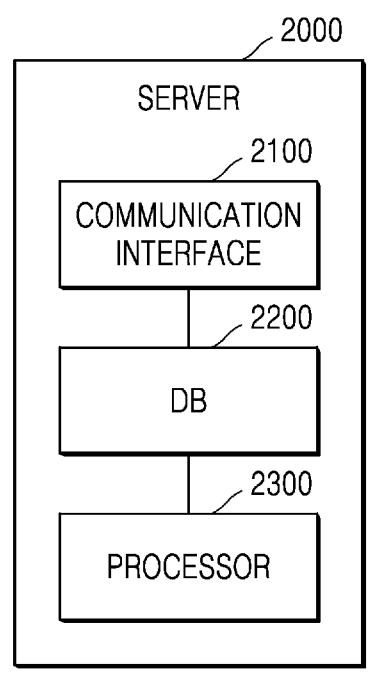
FIG. 16 is a block diagram of a server according to an embodiment.

FIG. 16 is a block diagram of a server 2000 according to an embodiment.

According to an embodiment, the server 2000 may include a communication interface 2100, a DB 2200, and a processor 2300.

The communication interface 2100 may correspond to the communication interface 1504 of the electronic device 1000 of FIG. 15. For example, the communication interface 2100 may receive an audio signal from the electronic device 1000, or may transmit to the electronic device 1000 a result of whether to activate a voice recognition service for the audio signal received from the electronic device 1000. The communication interface 2100 may transmit a wake-up recognition module stored in the server 2000 to the electronic device 1000, or receive information about a user call keyword customized by a user from the electronic device 1000. The communication interface 2100 may transmit to the electronic device 1000 a user-customized voice model including audio signals generated by inputting the user call keyword to a TTS module stored in the server 2000.

According to an embodiment, the communication interface 2100 may receive from the electronic device 1000 a user-customized feature and similar user-customized features generated based on the user call keyword and a similar keyword. When the communication interface 2100 modifies and refines layers within a wake-up recognition model within the wake-up recognition module and attention related to connection strengths between the layers, based on the user-customized feature and the similar user-customized features received from the electronic device 1000, the communication interface 2100 may transmit the layers of the wake-up recognition model within the wake-up recognition module and the attention values related to connection strengths between the layers to the electronic device 1000.

The DB 2200 may correspond to the memory 1402 of FIG. 15. For example, the DB 2200 may store a wake-up recognition module, a TTS module, an ASR module, a language model, a personalized language model, and an NUL model for providing a voice recognition service. The DB 2200 may further store a data augmentation algorithm and a feature extraction algorithm necessary for training the wake-up recognition module, the ASR module, or the TTS module.

The processor 2300 typically controls an overall operation of the server 2000. For example, the processor 2300 may entirely control the DB 2200 and the communication interface 2100 by executing the programs stored in the DB 2200 of the server 2000. The processor 2300 may perform some of the operations of the electronic device 1000 of FIGS. 1 through 18, by executing the programs stored in the DB 2200.

For example, the processor 2300 may generate a wake-up recognition model for activating a voice recognition service, and may control the communication interface 2100 to transmit the generated wake-up recognition model to the electronic device 1000.

The processor 2300 may control the communication interface 2100 to receive information about the user call keyword received from the electronic device 1000, and may generate a user-customized voice model including audio signals for the user call keyword that are output by inputting the user call keyword to the TTS module. The processor 2300 may control the communication interface 2100 to transmit the generated user-customized voice model to the electronic device 1000.

According to an embodiment, the processor 2300 may generate a wake-up recognition model that is different from the wake-up recognition model stored in the electronic device 1000. For example, the processor 2300 may control the communication interface 2100 to receive from the electronic device 1000 a user-customized feature and similar user-customized features generated based on the user call keyword and a similar keyword.

The processor 2300 may modify and refine layers within the wake-up recognition model and attention related to connection strengths between the layers, based on the user-customized feature and the similar user-customized features received from the electronic device 1000, and may transmit the modified and refined attention values to the electronic device 1000 in response to a request from the electronic device 1000.

Figure 17:
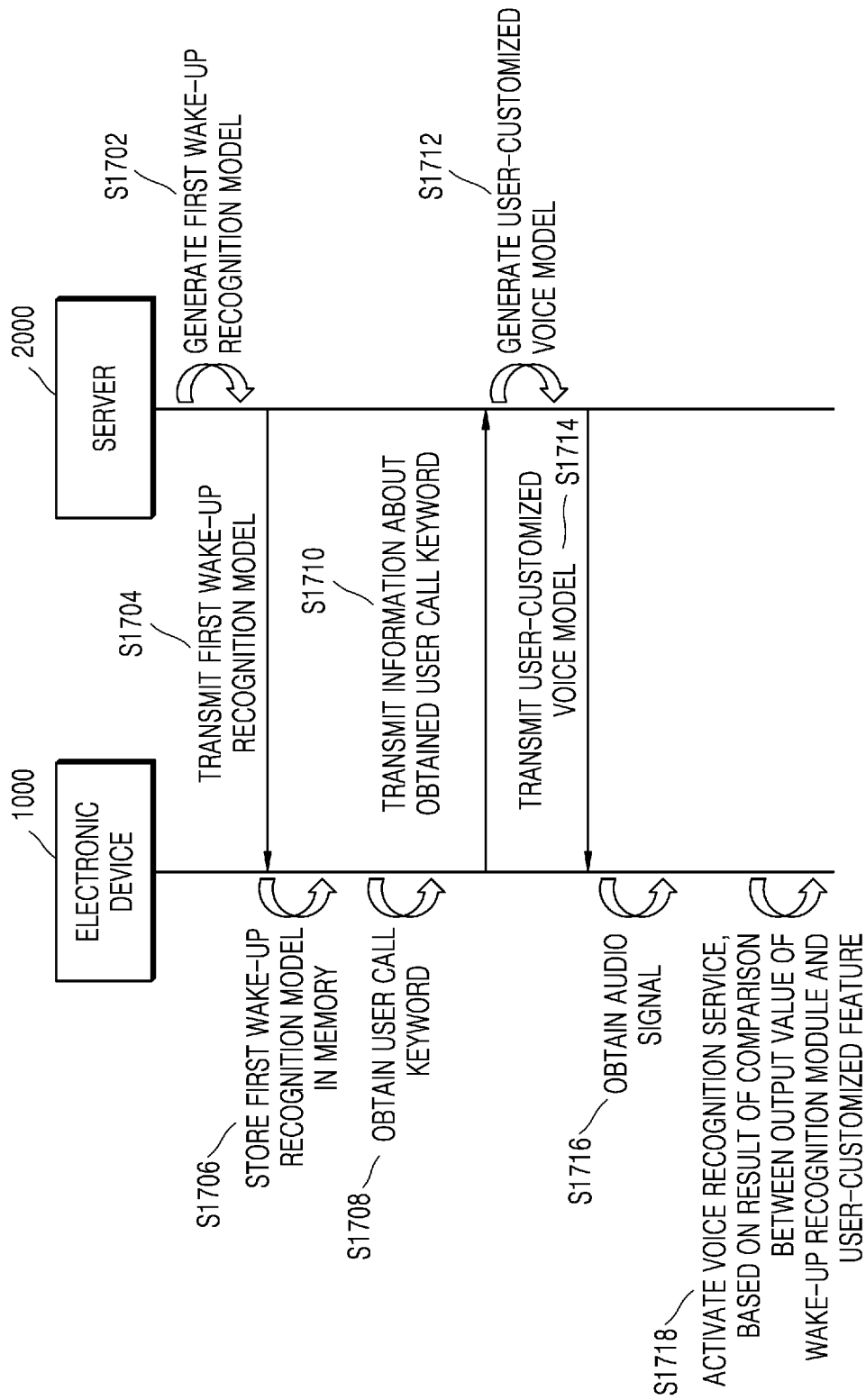
FIG. 17 is a flowchart of a method of providing a voice recognition service as an electronic device and a server interoperate with each other, according to an embodiment.

FIG. 17 is a flowchart of a method of providing a voice recognition service as an electronic device and a server interoperate with each other, according to an embodiment.

According to an embodiment, the electronic device 1000 may provide a voice recognition service by interoperating with the server 2000. For example, in operation S1702, the server 2000 may generate a first wake-up recognition model. In operation S1704, the server 2000 may transmit the generated first wake-up recognition model to the electronic device 1000. In operation S1706, the electronic device 1000 may store the received first wake-up recognition model in the memory. In other words, the electronic device 1000 may receive a wake-up recognition model from the server 2000 to determine whether to activate a voice recognition service, and may provide the voice recognition service by using a wake-up recognition module including the received wake-up recognition model.

In operation S1708, the electronic device 1000 may obtain a user call keyword from a user. The electronic device 1000 may obtain the user call keyword in at least one of a text format or an audio signal format. In operation S1710, the electronic device 1000 may transmit information about the obtained user call keyword to the server 2000. In operation S1712, the server 2000 may obtain user-customized features by inputting the user call keyword received from the electronic device 1000 to a TTS module stored in the server 2000 and inputting audio signals corresponding to the user call keyword output by the TTS module to a wake-up recognition module stored in the server 2000, and may generate a user-customized voice model including the obtained user-customized features.

In operation S1714, the server 2000 may transmit the generated user-customized voice model to the electronic device 1000. The electronic device 1000 may complete registration of the user call keyword by storing the user-customized voice model received from the server 2000 in the memory of the electronic device 1000. In operation S1716, the electronic device 1000 may obtain an audio signal from the user, after completing registration of the user call keyword.

In operation S1718, the electronic device 1000 may obtain an output value of the wake-up recognition module by inputting the obtained audio signal to the wake-up recognition module including the wake-up recognition model, and may compare the obtained output value of the wake-up recognition module with a user-customized feature within the user-customized voice model. The electronic device 1000 may activate a voice recognition service, based on a result of the comparison between the output value of the wake-up recognition module for the audio signal obtained in operation S1716 and the user-customized feature. A detailed method, performed by the electronic device 1000, of activating a voice recognition service, based on a result of the comparison between the output value of the wake-up recognition module and the user-customized feature is the same as that described above with reference to FIGS. 10 and 11, and a detailed description thereof will be omitted.

Figure 18:
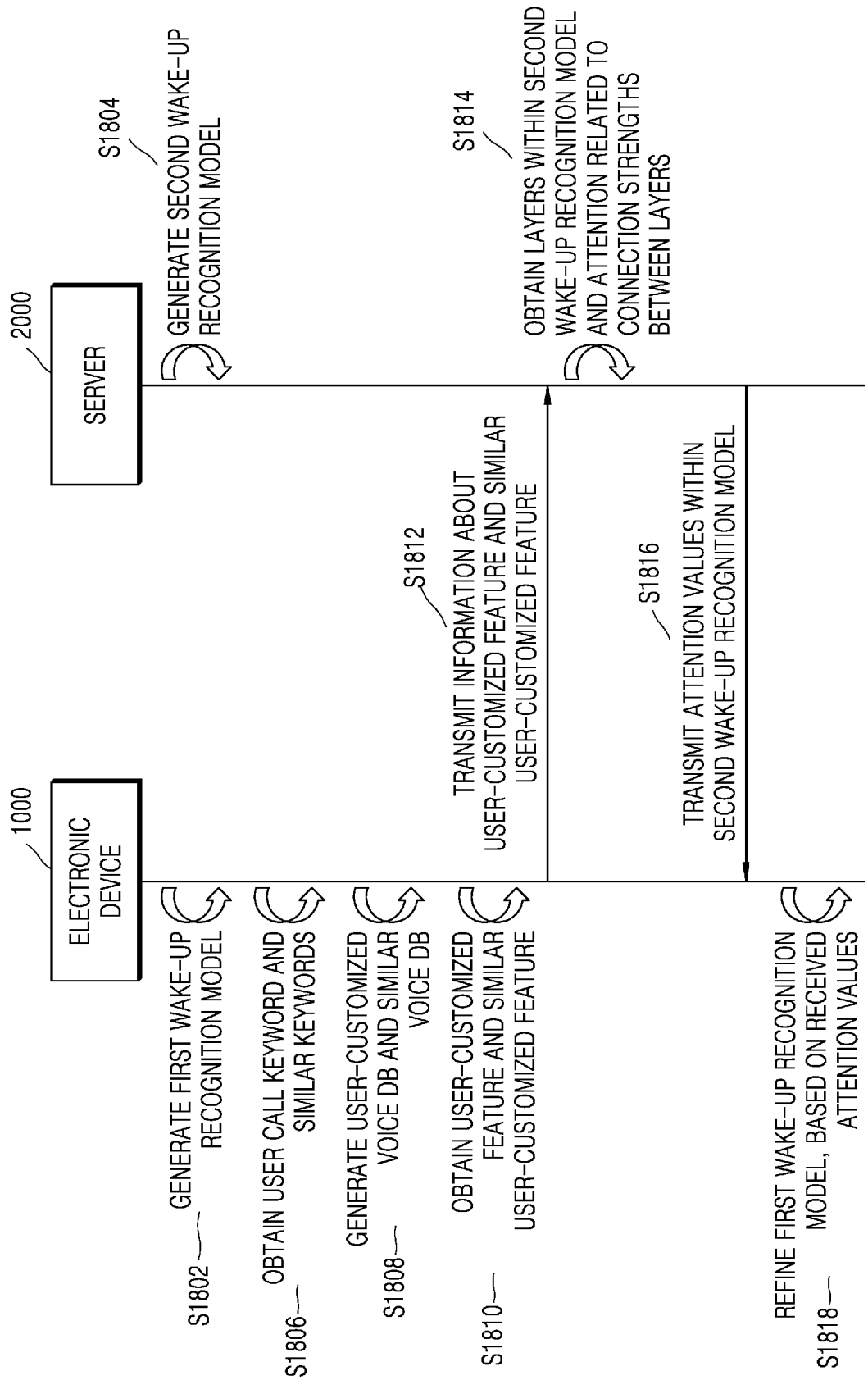
FIG. 18 is a flowchart of a method of refining a wake-up recognition model within a wake-up recognition module as an electronic device and a server interoperate with each other, according to an embodiment.

FIG. 18 is a flowchart of a method of refining a wake-up recognition model within a wake-up recognition module as the electronic device 1000 and a server interoperate with each other, according to an embodiment.

In operation S1802, the electronic device 1000 may generate a first wake-up recognition model. In operation S1804, the server 2000 may generate a second wake-up recognition model that is different from the first wake-up recognition model. In operation S1806, the electronic device 1000 may obtain a user call keyword from a user and may further obtain similar keywords that are similar to the user call keyword. A detailed method in which the electronic device 1000 obtains the similar keywords is the same as that described above with reference to FIG. 13, and thus a repeated description thereof will be omitted.

In operation S1808, the electronic device 1000 may obtain an audio signal related to the user call keyword and an audio signal related to the similar keyword by inputting the user call keyword and the similar keyword to a TTS module, and may generate a user-customized voice DB and a similar voice DB respectively including the audio signal related to the user call keyword and the audio signal related to the similar keyword.

In operation S1810, the electronic device 1000 may obtain a user-customized feature by inputting the audio signal within the user-customized voice DB to the wake-up recognition module including the first wake-up recognition model, and may obtain a similar user-customized feature by inputting the audio signal within the similar voice DB to the wake-up recognition module including the first wake-up recognition model. In operation S1812, the electronic device 1000 may transmit information about the user-customized feature and the similar user-customized feature to the server 2000.

In operation S1814, the server 2000 may modify and refine layers within the second wake-up recognition model and attention related to connection strengths between the layers, based on the user-customized feature and the similar user-customized feature received from the electronic device 1000, to thereby re-train the second wake-up recognition model. A detailed method, performed by the server 2000, of modifying and refining the layers within the second wake-up recognition model and the attention related to connection strengths between the layers, based on the user-customized feature and the similar user-customized feature received from the electronic device 1000, may correspond to operation S1260 of FIG. 12, and thus a detailed description thereof will be omitted.

In operation S1816, the server 2000 may transmit the modified and refined attention values within the second wake-up recognition model to the electronic device 1000. According to an embodiment, the server 2000 may transmit the modified and refined attention values within the second wake-up recognition model to the electronic device 1000 in response to a request from the electronic device 1000. In operation S1818, the electronic device 1000 may re-train the first wake-up recognition model by changing layers within the first wake-up recognition model and attention values related to connection strengths between the layers, based on the attention values received from the server 2000.

In other words, when the electronic device 1000 does not directly perform a process of re-training a wake-up recognition model, based on the user call keyword and the similar keywords and the server 2000 modifies and refines the layers within the second wake-up recognition model and the attention related to connection strengths between the layers, based on the user-customized feature and the similar user-customized feature, the electronic device 1000 may re-train the first wake-up recognition model by simply receiving the modified and refined attention.

Figure 19:
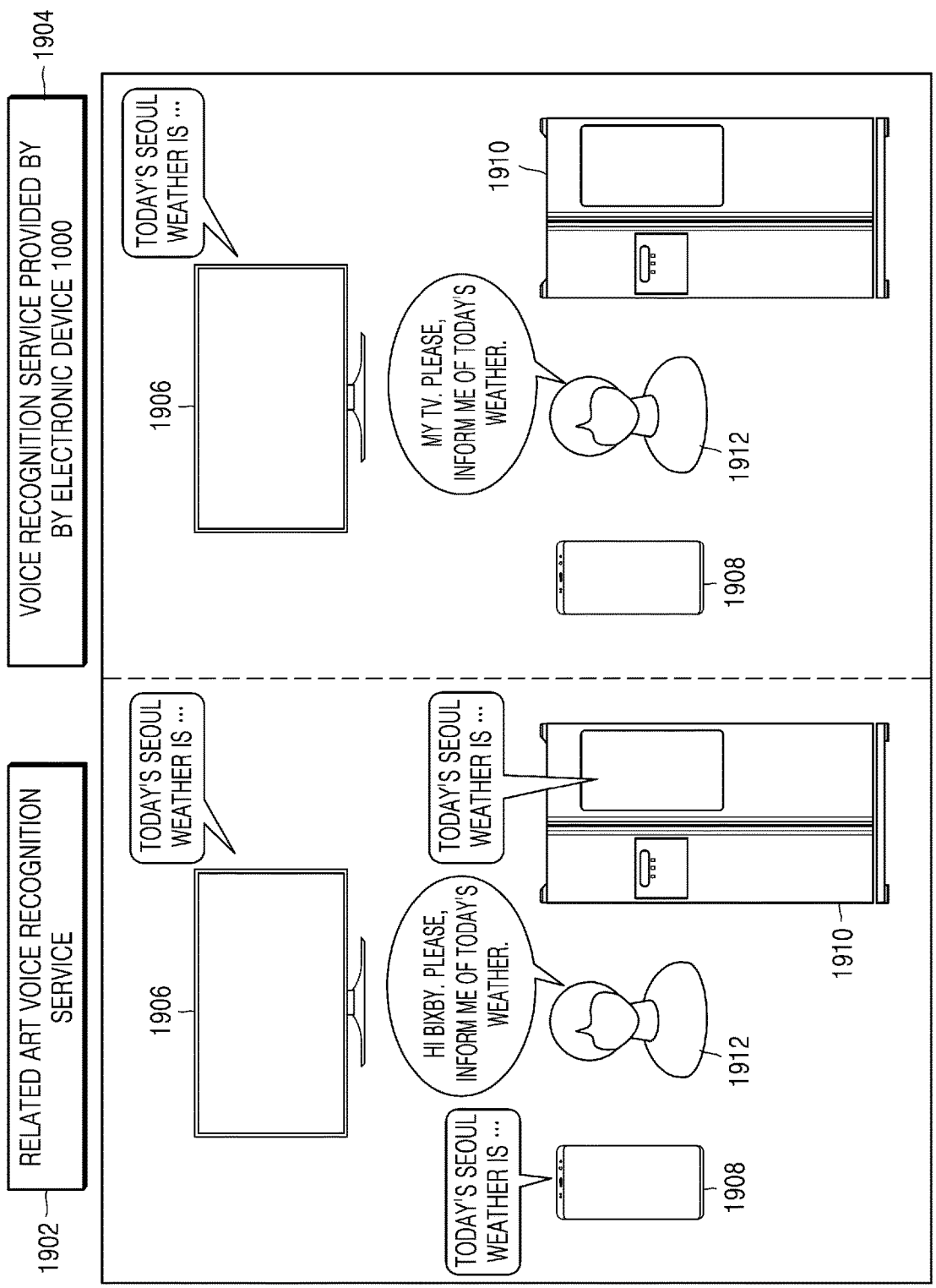
FIG. 19 is a diagram illustrating an example in which an electronic device provides a voice recognition service, according to an embodiment.

FIG. 19 is a diagram illustrating an example in which an electronic device provides a voice recognition service, according to an embodiment.

The electronic device 1000 according to an embodiment may register a user call keyword obtained from a user, and then may provide a voice recognition service, based on the registered user call keyword. For example, it is assumed that a user 1912 inputs an utterance such as 'Hi Bixby. Please, inform me of a today's weather.' to a smart TV 1906, a smartphone 1908, and a refrigerator 1910 that provide a related art voice recognition service 1902. The smart TV 1906, the smartphone 1908, and the refrigerator 1910 may identify a call keyword such as 'Hi Bixby' within an audio signal obtained from a user, and may simultaneously output audio signals, such as 'Today's Seoul weather is . . . ', as responses to a user voice. Accordingly, even when the user 1912 has an intention of activating only a voice recognition service of the smart TV 1906, the user 1912 might not be able to call only a certain device from among the smart TV 1906, the smartphone 1908, and the refrigerator 1910.

However, electronic devices 1000, such as a smart TV 1906, a smartphone 1908, and a refrigerator 1910 that provide a voice recognition service 1904 according to an embodiment, may activate voice recognition services, based on a call keyword customized by a user. Accordingly, when the user 1912 inputs an utterance such as 'My TV. Please, inform me of a today's weather.' to the smart TV 1906, the smartphone 1908, and the refrigerator 1910, the smart TV 1906, the smartphone 1908, and the refrigerator 1910 may identify a call keyword such as 'My TV' within an audio signal and, and only the smart TV 1906 that has registered 'My TV' as a call keyword may output an audio signal, such as 'Today's Seoul weather is . . . ', as a response to a user voice.

Figure 20:
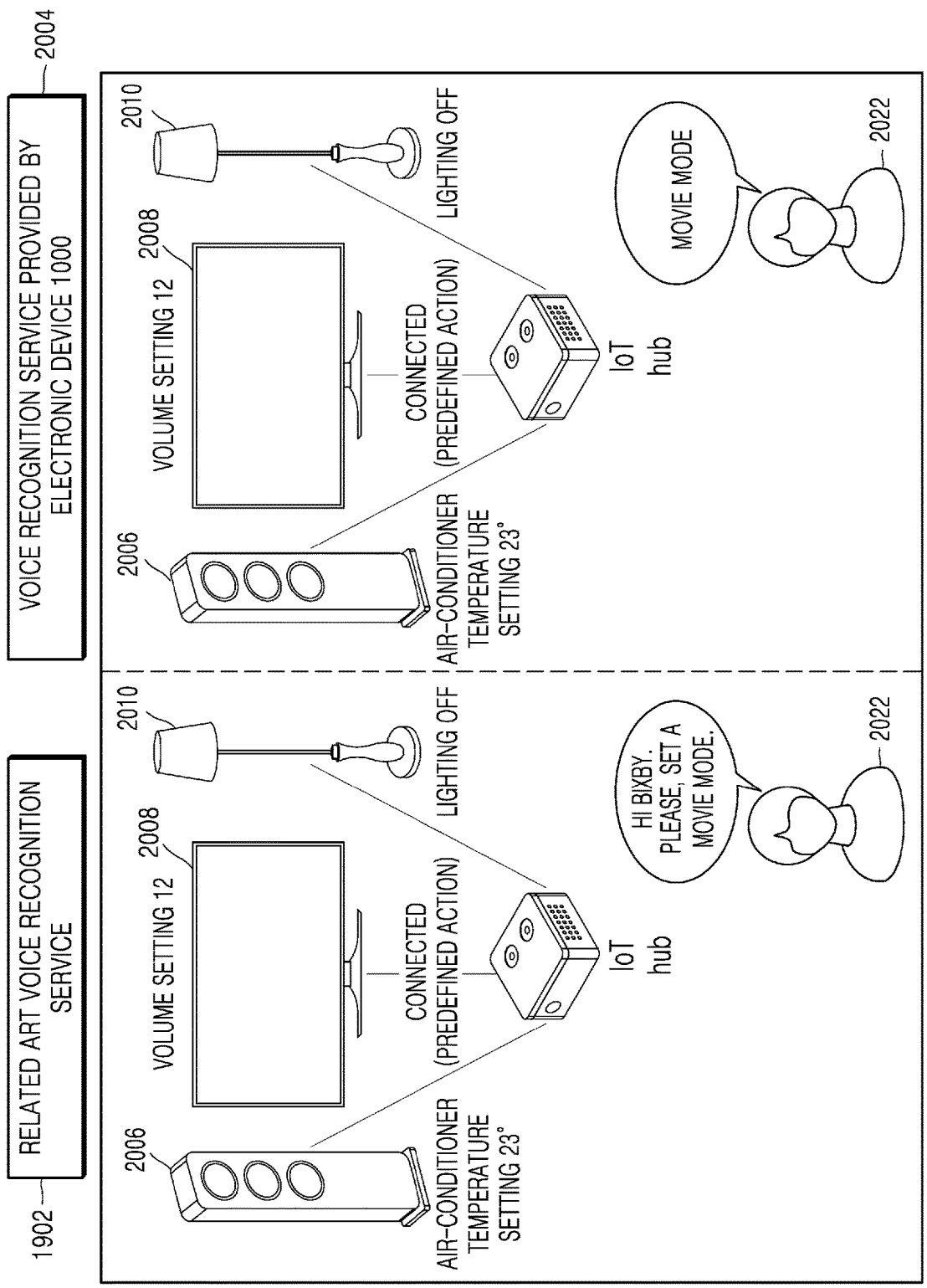
FIG. 20 is a diagram illustrating an example in which an electronic device provides a voice recognition service, according to an embodiment.

FIG. 20 is a diagram illustrating an example in which an electronic device provides a voice recognition service, according to an embodiment.

A situation is assumed, where a call keyword for activating a voice recognition service of the electronic device and a function call keyword for performing a certain function of the electronic device are both set as a 'Movie mode'.

The electronic device 1000 according to an embodiment may obtain an audio signal including a user voice of a user 2022 such as 'Movie mode', and may activate a voice recognition service when it is determined the call keyword 'Movie mode' is included within the obtained audio signal, but does not activate an ASR service for performing a particular function of the electronic device 1000, according to user voice recognition. Thus, in spite of a user intention of performing a particular function for movie mode setting, the electronic device 1000 may only active a voice recognition service and might not activate an ASR module for performing the particular function, thereby causing user inconvenience.

According to an embodiment, the electronic device 1000 may include a function call keyword DB including a plurality of function call keywords for performing particular functions of the electronic device 1000, and may compare a call keyword newly registered through FIGS. 3 and 4. For example, when the keyword feature of a newly registered call keyword and the keyword feature of a particular function call keyword within a function call keyword DB within the memory are greater than or equal to a preset threshold value, the electronic device 1000 may determine that the newly registered call keyword and the particular function call keyword are the same as each other.

When the electronic device 1000 determines that the newly registered call keyword and the particular function call keyword are the same as each other, the electronic device 1000 may activate a voice recognition service as it is determined that an audio signal newly obtained after call keyword registration includes a call keyword, and may also activate an ASR service for performing a particular function of the electronic device 1000, thereby performing a function of the electronic device 1000 that corresponds to the call keyword.

Referring back to FIG. 20, an air-conditioner 2006, a smart TV 2008, and a lighting stand 2010 that provide a voice recognition service 2004 according to an embodiment may store the function call keyword 'Movie mode' as a function call keyword in the memory, and may determine whether the newly registered call keyword is the same as the function call keyword within the memory.

When the newly registered user call keyword such as 'Movie mode' is the same as the function call keyword, the air-conditioner 2006, the smart TV 2008, and the lighting stand 2010 that provide the voice recognition service 2004 according to an embodiment may activate a voice recognition service and further activate an ASR service as the newly obtained audio signal includes a call keyword such as 'Movie mode', thereby performing operations corresponding to the function call keyword 'Movie mode' (for example, an air-conditioner setting a temperature to be 23 degrees, a smart TV setting a volume to be 12, and a lighting lamp being turned off).

Figure 21:
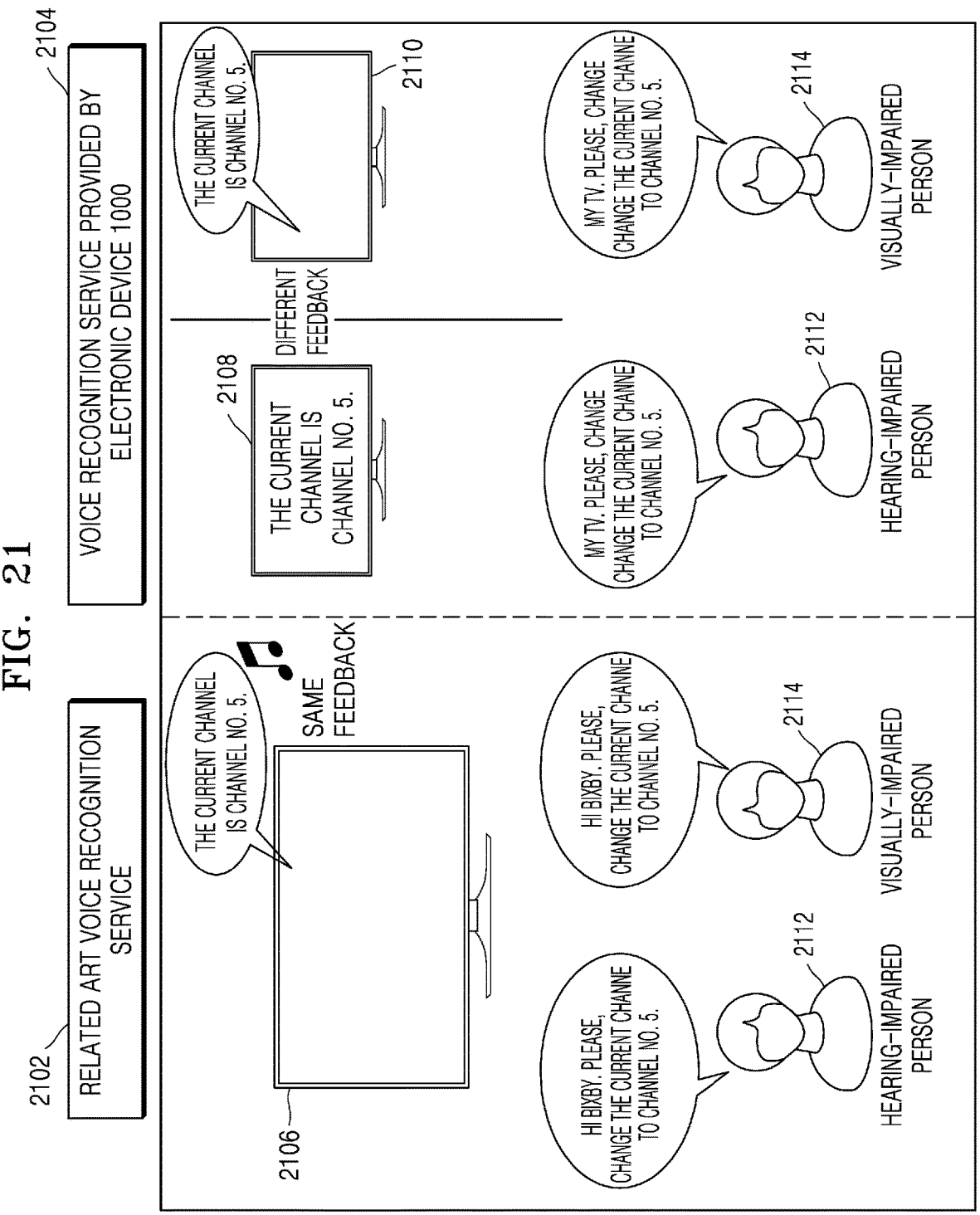
FIG. 21 is a diagram illustrating an example in which an electronic device provides a voice recognition service, according to an embodiment.

FIG. 21 is a diagram illustrating an example in which an electronic device provides a voice recognition service, according to an embodiment.

A smart TV 2106 that provides a related art voice recognition service 2102 may output, as a response to a user voice, such as 'Hi Bixby. Please, change a current channel to channel No. 5.', from a hearing-impaired user 2112 or a visually-impaired user 2114, only a feedback signal having the same form. However, electronic devices that provide a voice recognition service 2104 according to an embodiment may store personal information of a user in a memory together during user call keyword registration, and may output a response in an optimal form to a user voice, based on the stored personal information of the user.

For example, a hearing-impaired user 2112 tries to register a call keyword such as 'My TV', a smart TV 2108 obtains a call keyword input in a text format, such as 'My TV'. At this time, the smart TV 2108 may further receive information used to identify information about hearing impairment of the hearing-impaired user 2112 in addition to the call keyword input in a text format.

The smart TV 2108 generates a user-customized voice DB by inputting, to a TTS module capable of acoustic feature reflection, the call keyword obtained in a text format and a user call keyword voice DB related to keywords already registered by the hearing-impaired user 2112 to call the smart TV 2108 before a new call keyword is registered. Because the user-customized voice DB generated by the smart TV 2108 includes an audio signal output by the TTS module that receives the call keyword voice DB previously stored by the hearing-impaired user 2112 to call the smart TV 2108 before a new call keyword is registered, the user-customized voice DB may include a plurality of audio signals in which the acoustic feature of the hearing-impaired user 2112 is properly reflected.

The smart TV 2108 may generate a user-customized voice model by using user-customized features output by inputting the audio signals within the user-customized voice DB, in which the acoustic feature of the hearing-impaired user 2112 is properly reflected, and may store the generated user-customized voice model in a memory of the smart TV 2108, thereby completing registration of a new call keyword. In other words, the user-customized voice model includes a plurality of user-customized features in vector formats in which the acoustic feature of the hearing-impaired user 2112 is properly reflected, the plurality of user-customized features existing in the user-customized voice DB.

According to an embodiment, when storing the user-customized voice model in the memory, the smart TV 2108 may match the user-customized voice model with information about the impairment of a user and may store the user-customized voice model together with the information about the impairment of the user in the memory. In other words, the smart TV 2108 may match a user-customized voice model corresponding to the call keyword such as 'My TV' with information use to identify the hearing impairment of the hearing-impaired user 2112, and may store, in the memory, the user-customized voice model together with the information use to identify the hearing impairment of the hearing-impaired user 2112.

After registration of the new call keyword such as 'My TV' is completed, the smart TV 2108 may obtain an audio signal including a user voice such as 'My TV. Please, change a current channel to channel No. 5.' from the hearing-impaired user 2112. By comparing the audio feature within the audio signal with the user-customized feature of the memory within the smart TV 2108, the smart TV 2108 may determine whether the newly registered call keyword is included in the audio signal, and may also perform speaker verification, based on the speaker features respectively included in the audio feature and the user-customized feature.

In other words, the smart TV 2108 may activate a voice recognition service when it is determined that the newly registered call keyword 'My TV' is included in the audio signal, and may complete speaker verification when a result value of a comparison between the speaker features respectively included in the audio feature of the newly obtained audio signal and the user-customized feature is greater than or equal to a preset threshold value. When the same speaker is identified as a result of the comparison between the speaker features respectively included in the audio feature of the newly obtained audio signal and the user-customized feature by the smart TV 2108, the smart TV 2108 identifies the information about hearing impairment from among pieces of user's personal information matched with the user-customized voice model and stored.

The smart TV 2108 may generate a first candidate operation of generating a subtitle such as 'A current channel is channel No. 5.' and a second candidate operation of generating an audio signal such as 'A current channel is channel No. 5.', as candidate responding operations for a user voice such as 'My TV. Please, change a current channel to channel No. 5.'. Although the smart TV 2108 may perform the generated candidate responding operations together, the smart TV 2108 may perform only the first candidate operation because the information about hearing impairment has been identified through a current speaker verification.

According to an embodiment, when a user is a visually-impaired user 2114, a smart TV 2110 may match a user-customized voice model corresponding to the call keyword such as 'My TV' with information use to identify the visual impairment of the visually-impaired user 2114, and may store, in the memory, the user-customized voice model together with the information use to identify the visual impairment of the visually-impaired user 2114.

After registration of the new call keyword such as 'My TV' is completed, the smart TV 2110 may obtain an audio signal including a user voice such as 'My TV. Please, change a current channel to channel No. 5.' from the visually-impaired user 2114. By comparing the audio feature within the audio signal with the user-customized feature of the memory within the smart TV 2110, the smart TV 2110 may determine whether the newly registered call keyword is included in the audio signal, and may also perform speaker verification, based on the speaker features respectively included in the audio feature and the user-customized feature.

In other words, the smart TV 2110 may activate a voice recognition service when it is determined that the newly registered call keyword 'My TV' is included in the audio signal, and may complete speaker verification when a result value of a comparison between the speaker features respectively included in the audio feature of the newly obtained audio signal and the user-customized feature is greater than or equal to a preset threshold value. When the same speaker is identified as a result of the comparison between the speaker features respectively included in the audio feature of the newly obtained audio signal and the user-customized feature by the smart TV 2110, the smart TV 2110 identifies the information about visual impairment from among pieces of user's personal information matched with the user-customized voice model and stored.

The smart TV 2110 may generate a first candidate operation of generating a subtitle such as Current channel is channel No. 5.' and a second candidate operation of generating an audio signal such as Current channel is channel No. 5.', as candidate responding operations for a user voice such as 'My TV. Please, change the current channel to channel No. 5.' Although the smart TV 2110 may perform the generated candidate responding operations together, the smart TV 2110 may perform only the second candidate operation because the information about visual impairment has been identified through a current speaker verification.

Figure 22:
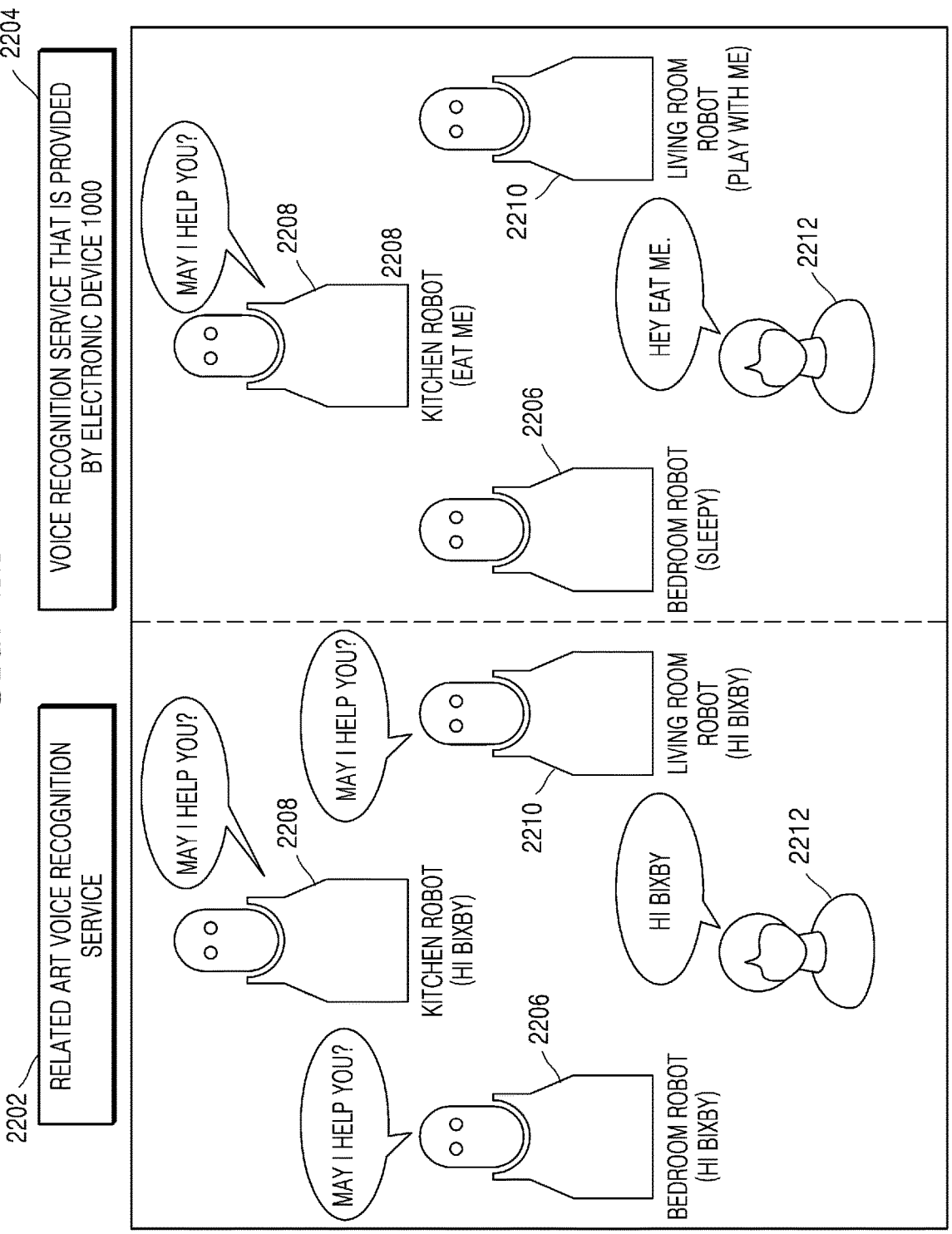
FIG. 22 is a diagram illustrating an example in which an electronic device provides a voice recognition service, according to an embodiment.

FIG. 22 is a diagram illustrating an example in which an electronic device provides a voice recognition service, according to an embodiment.

A voice recognition service according to an embodiment may be utilized in controlling a robot group communicating with each other in real time, by constituting a network. For example, a bedroom robot 2206, a kitchen robot 2208, and a living room robot 2210 to which a related art voice recognition service 2202 has been applied may register only a call keyword pre-stored during the manufacture of software for providing a product or a voice recognition service, such as 'Hi Bixby', and could not provide a call keyword customized by a user as a call keyword. Accordingly, even when a user 2212 utters a user voice such as 'Hi Bixby' with an intention of calling only the bedroom robot 2206, the bedroom robot 2206, the kitchen robot 2208, and the living room robot 2210 to which the related art voice recognition service 2202 has been applied provide speaker outputs such as 'May I help you?' as a response to the user voice together, as the call keyword such as 'Hi Bixby' within the user voice is identified. However, a bedroom robot 2206, a kitchen robot 2208, and a living room robot 2210 to which a voice recognition service 2204 according to an embodiment has been applied may independently activate a voice recognition service, based on a call keyword customized by a user. For example, the bedroom robot 2206, the kitchen robot 2208, and the living room robot 2210 may differently register call keywords such as 'Sleepy', 'Eat Me' and 'Play with me' by storing a user-customized voice model related to the call keywords in a memory according to the voice recognition service providing method described above with reference to FIGS. 3 and 4. Therefore, when all of the bedroom robot 2206, the kitchen robot 2208, and the living room robot 2210 to which the voice recognition service 2204 according to an embodiment has been applied obtains a user voice such as 'Hey Eat Me' from the user 2212, only the kitchen robot 2208 that has previous registered 'Eat me' as a user call keyword may output an audio signal such as 'May I help you?' as a response to the user voice.

A method, performed by an electronic device, of providing a voice recognition service and a method, performed by the electronic device, of activating a voice recognition service, according to an embodiment, may be embodied as program commands executable by various computer means and may be recorded on a computer-readable recording medium. The computer-readable recording medium may include program commands, data files, data structures, and the like separately or in combinations. The program commands to be recorded on the computer-readable recording medium may be specially designed and configured for embodiments of the disclosure or may be well-known to and be usable by one of ordinary skill in the art of computer software. In addition, a computer program product including a recording medium storing a program for causing the electronic device to perform a method of providing a virtual device related to the electronic device through at least a portion of the content displayed on the electronic device may be provided.

Examples of the computer-readable recording medium include a magnetic medium such as a hard disk, a floppy disk, or a magnetic tape, an optical medium such as a compact disk-read-only memory (CD-ROM) or a digital versatile disk (DVD), a magneto-optical medium such as a floptical disk, and a hardware device specially configured to store and execute program commands such as a ROM, a random-access memory (RAM), or a flash memory. Examples of the program commands are advanced language codes that can be executed by a computer by using an interpreter or the like as well as machine language codes made by a compiler.

Some embodiments of the disclosure may also be embodied as a storage medium including instruction codes executable by a computer such as a program module executed by the computer. A computer readable medium can be any available medium which can be accessed by the computer and includes all volatile/non-volatile and removable/non-removable media. Further, the computer readable medium may include all computer storage and communication media. The computer storage medium includes all volatile/non-volatile and removable/non-removable media embodied by a certain method or technology for storing information such as a computer readable instruction, a data structure, a program module or other data. The communication medium typically includes the computer readable instruction, the data structure, the program module, or other data of a modulated data signal, or other transmission mechanism, and includes any information transmission medium. Some embodiments of the disclosure may be implemented as a computer program or a computer program product including instructions executable by a computer.

While one or more embodiments of the disclosure have been described with reference to the figures, it will be understood by those of ordinary skill in the art that various changes in form and details may be made therein without departing from the spirit and scope as defined by the following claims.

What is claimed is:

1. A method, performed by an electronic device, of providing a voice recognition service, the method comprising:

obtaining a first call keyword configured to activate the voice recognition service, based on a first user input of a user;

generating a user-customized voice database (DB) by inputting the obtained first call keyword to a text to speech (TTS) module pre-trained to output an audio signal in which an acoustic feature of the user has been reflected, the user-customized voice DB including the audio signal; and obtaining a user-customized feature by inputting the audio signal of the user-customized voice DB to a wake-up recognition module.

2. The method of claim 1, further comprising:

obtaining a voice DB related to a call keyword stored before the first call keyword is obtained, to activate the voice recognition service; and generating the user-customized voice DB by inputting the obtained voice DB and the first call keyword to the TTS module.

3. The method of claim 2, further comprising:

obtaining an audio signal based on a second user input of the user, the second user input being a voice input of the user;

obtaining an output value of the wake-up recognition module from the wake-up recognition module by inputting the obtained audio signal to the wake-up recognition module; and activating the voice recognition service, based on a result of a comparison between the obtained output value of the wake-up recognition module and the user-customized feature.

4. The method of claim 3, wherein the obtaining the audio signal comprises:

determining a window length of a window for division in units of frames;

overlapping windows each having the determined window length at a certain window interval; and dividing the obtained audio signal into a plurality of frames by using the overlapped windows.

5. The method of claim 3, wherein the wake-up recognition module includes a wake-up recognition model including a shared layer to which audio features extracted from consecutive frames within a certain section from among a plurality of frames obtained based on the second user input are simultaneously input, a speaker identification layer for identifying a speaker feature of the audio signal when a frame unit representation output by the shared layer is input, an acoustic feature identification layer for identifying an acoustic feature of the audio signal, and a keyword identification layer for identifying a keyword feature included in the audio signal.

6. The method of claim 5, wherein the obtaining the output value of the wake-up recognition module comprises:

obtaining the speaker feature, the acoustic feature of the audio signal, and the keyword feature on respective segment levels of the speaker identification layer, the acoustic feature identification layer, and the keyword identification layer;

setting attention to the speaker feature, the acoustic feature of the audio signal, and the keyword feature; and obtaining the output value of the wake-up recognition module by concatenating at least one of the speaker feature, the acoustic feature of the audio signal, or the keyword feature, according to the attention.

7. The method of claim 5, wherein the activating the voice recognition service comprises:

determining a similarity score related to a similarity between the output value of the wake-up recognition module and the user-customized feature; and activating the voice recognition service, based on whether the determined similarity score is greater than or equal to a preset first threshold value.

8. The method of claim 5, wherein the activating the voice recognition service comprises:
determining respective portion similarity scores of the speaker feature, the acoustic feature of the audio signal, and the keyword feature within the audio features; and
activating the voice recognition service when a portion similarity score of the speaker feature is greater than or equal to a second threshold value, a portion similarity score of the acoustic feature of the audio signal is greater than or equal to a third threshold value, and the portion similarity score of the keyword feature is greater than or equal to a fourth threshold value.

9. The method of claim 5, wherein the acoustic feature identification layer within the wake-up recognition model is removed when training of the wake-up recognition model is completed.

10. The method of claim 2, wherein the TTS module is configured to change audio signals of the user-customized voice DB, based on at least one acoustic feature for uttering the first call keyword that is obtained from a speaker voice model including acoustic features of a plurality of speakers.

11. The method of claim 1, further comprising:
generating similar keywords that are similar to the first call keyword, by using a pre-stored language model;
generating a similar voice DB by inputting the generated similar keywords to the TTS module; and
refining layers within the wake-up recognition module and attention related to a connection strength between the layers, based on audio signals of the similar voice DB and the user-customized voice DB.

12. The method of claim 1, further comprising:
generating a user-customized voice model, based on the user-customized feature; and
storing the generated user-customized voice model.

13. The method of claim 1, wherein the first user input is a user input in a text format received through a user input interface of the electronic device.

14. An electronic device for providing a voice recognition service, the electronic device comprising:
a memory storing one or more instructions; and
a processor configured to execute the one or more instructions to:
obtain a first call keyword for activating the voice recognition service, based on a first user input of a user,
generate a user-customized voice database (DB) by inputting the obtained first call keyword to a text to speech (TTS) module pre-trained to output an audio signal in which an acoustic feature of the user has been reflected, the user-customized voice DB including the audio signal, and
obtain a user-customized feature by inputting the audio signal of the user-customized voice DB to a wake-up recognition module.

15. The electronic device of claim 14, wherein the processor is further configured to execute the one or more instructions to:
obtain a voice DB related to a call keyword previously stored before the first call keyword is obtained, in order to activate the voice recognition service, and
generate the user-customized voice DB by inputting the obtained voice DB and the first call keyword to the TTS module.

16. The electronic device of claim 15, wherein the processor is further configured to execute the one or more instructions to:
obtain an audio signal based on a second user input of the user, the second user input being a voice input,
obtain an output value of the wake-up recognition module from the wake-up recognition module by inputting the obtained audio signal to the wake-up recognition module, and
activate the voice recognition service, based on a result of a comparison between the obtained output value of the wake-up recognition module and the user-customized feature.

17. The electronic device of claim 16, wherein the processor is further configured to execute the one or more instructions to:
determine a window length of a window for division in units of frames,
overlap windows each having the determined window length at a certain window interval, and
divide the obtained audio signal into a plurality of frames by using the overlapped windows.

18. The electronic device of claim 16, wherein the wake-up recognition module includes a wake-up recognition model including a shared layer to which audio features extracted from consecutive frames within a certain section from among a plurality of frames obtained based on the second user input are simultaneously input, a speaker identification layer for identifying a speaker feature of the audio signal when a frame unit representation output by the shared layer is input, an acoustic feature identification layer for identifying an acoustic feature of the audio signal, and a keyword identification layer for identifying a keyword feature included in the audio signal.

19. The electronic device of claim 15, wherein the TTS module is configured to change audio signals of the user-customized voice DB, based on at least one acoustic feature for uttering the first call keyword that is obtained from a speaker voice model including acoustic features of a plurality of speakers.

20. The electronic device of claim 14, wherein the processor is further configured to execute the one or more instructions to:
generate similar keywords that are similar to the first call keyword, by using a pre-stored language model,
generate a similar voice DB by inputting the generated similar keywords to the TTS module, and
refine layers within the wake-up recognition module and attention related to a connection strength between the layers, based on audio signals of the similar voice DB and the user-customized voice DB.

21. The electronic device of claim 14, wherein the first user input is a user input in a text format received through a user input interface of the electronic device.

22. A non-transitory computer-readable recording medium having recorded thereon a program which, when executed by a computer system, causes the computer system to perform a method of providing a voice recognition service, the method comprising:
obtaining a first call keyword for activating the voice recognition service, based on a first user input of a user;
generating a user-customized voice database (DB) by inputting the obtained first call keyword to a text to speech (TTS) module pre-trained to output an audio signal in which an acoustic feature of the user has been reflected, the user-customized voice DB including the audio signal; and obtaining a user-customized feature by inputting the audio signal of the user-customized voice DB to a wake-up recognition module.

23. The non-transitory computer-readable recording medium of claim 22, the method further comprising:
obtaining a voice DB related to a call keyword stored before the first call keyword is obtained, to activate the voice recognition service; and
generating the user-customized voice DB by inputting the obtained voice DB and the first call keyword to the TTS module.

24. The non-transitory computer-readable recording medium of claim 22, wherein the first user input is a user input in a text format received through a user input interface of an electronic device.

* * * * *